United States Patent
Jin et al.

(10) Patent No.: US 11,691,310 B2
(45) Date of Patent: Jul. 4, 2023

(54) AUTOMATED LUMBER CUTTING AND DELIVERY SYSTEM

(71) Applicant: MITEK HOLDINGS, INC., Wilmington, DE (US)

(72) Inventors: Kathy Jin, Chesterfield, MO (US); Du Kim, Chesterfield, MO (US); Vicky Carroll, Chesterfield, MO (US); Karl Vielhaber, Chesterfield, MO (US); Kyle Brown, Chesterfield, MO (US); Jeffrey Fritz, Jr., Chesterfield, MO (US); Travis Shelton, Chesterfield, MO (US); Efegbare Efenedo, Chesterfield, MO (US); Manish Kanjee, Chesterfield, MO (US)

(73) Assignee: MITEK HOLDINGS, INC., Wilmington, DE (US)

( * ) Notice: Subject to any disclaimer, the term of this patent is extended or adjusted under 35 U.S.C. 154(b) by 423 days.

(21) Appl. No.: 16/757,063

(22) PCT Filed: Oct. 19, 2018

(86) PCT No.: PCT/US2018/056723
§ 371 (c)(1),
(2) Date: Apr. 17, 2020

(87) PCT Pub. No.: WO2019/079728
PCT Pub. Date: Apr. 25, 2019

(65) Prior Publication Data
US 2020/0246999 A1 Aug. 6, 2020

Related U.S. Application Data

(60) Provisional application No. 62/575,335, filed on Oct. 20, 2017.

(51) Int. Cl.
*B27B 31/08* (2006.01)
*B27F 7/15* (2006.01)

(52) U.S. Cl.
CPC ............. *B27B 31/08* (2013.01); *B27F 7/155* (2013.01)

(58) Field of Classification Search
CPC ........ B27M 1/005; B27M 1/007; B27M 1/08; B27M 3/02; B27M 3/08; B27B 5/06;
(Continued)

(56) References Cited

U.S. PATENT DOCUMENTS 1,220,799 A 3/1917 Tanner
1,871,675 A 8/1932 Ermold
(Continued)

FOREIGN PATENT DOCUMENTS

CN 107206614 A * 9/2017 .......... B25J 15/0616
EP 1134198 A1 9/2001
NL 1016274 C1 3/2002

OTHER PUBLICATIONS

International Search Report & Written Opinion dated Jan. 4, 2019 in related PCT application PCT/US2018/056723, 14 pages.
(Continued)

*Primary Examiner* — Shelley M Self
*Assistant Examiner* — Jared O Brown
(74) *Attorney, Agent, or Firm* — Stinson LLP

(57) ABSTRACT

A lumber cutting and delivery system for use in assembling trusses on a truss table includes a saw configured to receive a piece of material therein. The saw is configured to cut the piece of material into one or more pieces and at different lengths and angles so that at least some of the one or more pieces are the components of at least one truss. A trunk conveyor system is positioned to receive the one or more pieces cut from the saw. The trunk conveyor system has a
(Continued)

first conveying element to transport the one or more pieces over a distance in a travel direction and an ejector configured to discharge the one or more pieces from the first conveying element in a first discharge direction. A branch conveyor system is configured to receive the one or more pieces discharged from the trunk conveyor system in the first discharge direction. The branch conveyor system has a main conveying element to transport the one or more pieces.

22 Claims, 30 Drawing Sheets

(58) Field of Classification Search
CPC .......... B27B 5/061; B27B 5/065; B27B 7/00; B27B 7/02; B27B 7/04; B27B 25/00; B27B 25/04; B27B 25/06; B27B 25/08; B27B 31/00; B27B 31/006; B27B 31/08; B27G 5/00; B27G 5/02; B27G 5/023; B27G 5/026; B27G 5/04; B65G 43/08; B65G 47/30; B65G 47/32; B65G 47/53; B65G 47/54
USPC .......................................................... 83/106
See application file for complete search history.

(56) References Cited

U.S. PATENT DOCUMENTS

| | | | |
|---|---|---|---|
| 2,124,397 A | 7/1938 | Gwinn et al. | |
| 2,217,982 A | 10/1940 | Heil et al. | |
| 2,636,601 A | 4/1953 | Bovay, Jr. et al. | |
| 2,762,508 A | 9/1956 | Parton | |
| 2,821,301 A | 1/1958 | Montague | |
| 3,000,499 A | 9/1961 | Bovay, Jr. et al. | |
| 3,502,123 A | 3/1970 | Golick et al. | |
| 3,515,254 A | 6/1970 | Gary | |
| 3,531,001 A | 9/1970 | Lunden | |
| 3,557,952 A | 1/1971 | Heiklmheimo | |
| 3,680,692 A | 8/1972 | Southworth | |
| 3,687,178 A | 8/1972 | Golick et al. | |
| 4,005,787 A | 2/1977 | Sleep | |
| 4,039,073 A | 8/1977 | Ohlhaver | |
| 4,195,346 A | 3/1980 | Schroder | |
| 4,295,559 A * | 10/1981 | Neal ...................... | B65G 47/82 |
| | | | 198/598 |
| 4,430,915 A * | 2/1984 | Rutherford ............. | B27B 31/08 |
| | | | 83/425.4 |
| 4,833,954 A * | 5/1989 | Jenkner ................... | B27B 31/08 |
| | | | 83/156 |
| 5,201,258 A | 4/1993 | Cremona | |
| 5,887,699 A | 3/1999 | Tharpe | |
| 6,370,447 B1 | 4/2002 | Miyazaki | |
| 6,536,580 B1 | 3/2003 | Fritzsche | |
| 6,539,615 B2 | 4/2003 | Redden | |
| 6,662,931 B2 | 12/2003 | Bruun et al. | |
| 6,702,269 B1 | 3/2004 | Tadich | |
| 6,776,293 B1 | 8/2004 | Gunnarsson | |
| 6,807,903 B2 | 10/2004 | Anderson | |
| 7,011,006 B2 | 3/2006 | Koskovich | |
| 7,261,198 B2 | 8/2007 | Tatar et al. | |
| 7,826,921 B2 * | 11/2010 | Kellam .................. | G06Q 10/06 |
| | | | 144/41 |
| 7,870,879 B2 | 1/2011 | Koskovich | |
| 7,950,316 B2 | 5/2011 | Koskovich | |
| 7,975,829 B2 | 7/2011 | Rogers et al. | |
| 3,060,243 A1 | 11/2011 | Ogawa | |
| 8,752,711 B2 | 6/2014 | Campbell | |
| 8,960,244 B1 | 2/2015 | Aylsworth et al. | |
| 9,845,205 B2 | 12/2017 | Keller | |
| 9,926,144 B1 * | 3/2018 | Lepage ................ | B65G 47/261 |
| 10,580,126 B1 * | 3/2020 | Weinschenk ............ | B27B 25/00 |
| 2003/0015256 A1 * | 1/2003 | Quenneville ........... | B27B 29/08 |
| | | | 144/357 |
| 2003/0147737 A1 * | 8/2003 | Pfeiffer .................. | B65G 61/00 |
| | | | 414/792.9 |
| 2005/0071977 A1 | 4/2005 | Kanjee et al. | |
| 2006/0259252 A1 * | 11/2006 | Leitinger ................ | B27M 3/002 |
| | | | 702/43 |
| 2006/0288831 A1 | 12/2006 | Koskovich | |
| 2008/0172983 A1 | 7/2008 | Urmson | |
| 2008/0223767 A1 | 9/2008 | Ahrens | |
| 2010/0061829 A1 | 3/2010 | McAdoo et al. | |
| 2013/0091995 A1 * | 4/2013 | Brooks .................. | B27B 31/08 |
| | | | 83/99 |
| 2017/0217022 A1 * | 8/2017 | Aylsworth ............. | B65G 59/08 |
| 2017/0312789 A1 * | 11/2017 | Schroader ............. | B65G 47/54 |
| 2018/0200914 A1 | 7/2018 | Hundegger | |

OTHER PUBLICATIONS

International Preliminary Report on Patentability dated Apr. 30, 2020 in related PCT application PCT/US2018/056723, 9 pages.

* cited by examiner

US 11,691,310 B2

AUTOMATED LUMBER CUTTING AND DELIVERY SYSTEM

CROSS-REFERENCE TO RELATED APPLICATIONS

This application is a National Stage Entry of, and claims priority to, PCT Patent Application No. PCT/US2018/056723, filed Oct. 19, 2018, which claims priority to U.S. Provisional Patent Application No. 62/575,335, filed Oct. 20, 2017, both of which are hereby incorporated by reference in their entireties.

FIELD OF THE INVENTION

The present invention generally relates to automated lumber cutting and delivery systems. More particularly the invention relates to the processing and delivery of sections of lumber to a desired location.

BACKGROUND

Rising labor costs and demands for more time and cost-efficient construction have made it desirable to construct building components and modules off site at specialized fabrication facilities. With wood frame structures, especially prefabricated residential structures, there are great economies to be realized by providing automated equipment that can measure and cut lumber components utilized in wall panels, roof trusses, and other prefabricated items. Where significant quantity of a particular structural element, such as roof trusses, is needed, the use of such automated systems can greatly decrease construction time and lower costs, especially labor costs. The economies of this approach are very appealing for custom structural designs. For wood structures where the framing is constructed on site, precutting and marking lumber off site location can create a kit design minimizing measuring, sawing, and the need for specialized labor on site. This can result in faster construction as well as minimized cost. On-site construction errors can also be minimized.

Prefabricated roof trusses in particular, generally include multiple pieces of lumber that must be precision cut to specific lengths as well as having precision mitered ends to form tight-fitting joints. A typical roof truss includes two top chords, a bottom chord, several webs and many also include wedges and overhangs. Many of these pieces require a preparation of mitered cuts at the ends of the lumber pieces. Truss plates with teeth are typically utilized to securely make the connection. For a truss to achieve its maximum structural integrity and strength, the joints between the various wooden parts should be tight fitting. Thus precision cutting of truss members is quite important to creating a truss that meets engineering standards.

SUMMARY OF THE INVENTION

In one aspect, a lumber cutting and delivery system for use in assembling trusses on a truss table comprises a saw configured to receive a piece of material therein. The saw is configured to cut the piece of material into one or more pieces and cut the piece of material at different lengths and angles so that at least some of the one or more pieces are the components of at least one truss. A trunk conveyor system is positioned to receive the one or more pieces cut from the saw. The trunk conveyor system has a first conveying element to transport the one or more pieces over a distance in a travel direction and an ejector configured to discharge the one or more pieces from the first conveying element in a first discharge direction. A branch conveyor system is configured to receive the one or more pieces discharged from the trunk conveyor system in the first discharge direction. The branch conveyor system has a main conveying element to transport the one or more pieces.

In another aspect, a lumber cutting and delivery system for use in assembling wooden constructs on a table comprises a saw configured to receive a piece of material therein. The saw is configured to cut the piece of material into a component member to be used in the creation of the wooden construct, a waste member to be discarded, and/or a remainder member capable of being cut by the saw again into an additional component member. A trunk conveyor system is positioned to receive the component member, waste member, and/or remainder member cut by the saw. The trunk conveyor system has a first conveying element to transport the component member, waste member, and/or remainder member over a distance and an ejector configured to selectively discharge the component member, waste member, and/or remainder member from the first conveying element. A first receiving unit is disposed adjacent to the first conveying element and is configured to receive the component member, waste member, and/or remainder member discharged from the first conveying element by the ejector.

BRIEF DESCRIPTION OF THE DRAWINGS

Corresponding parts are indicated by corresponding reference characters throughout the several views of the drawings.

DETAILED DESCRIPTION

Figure 1:
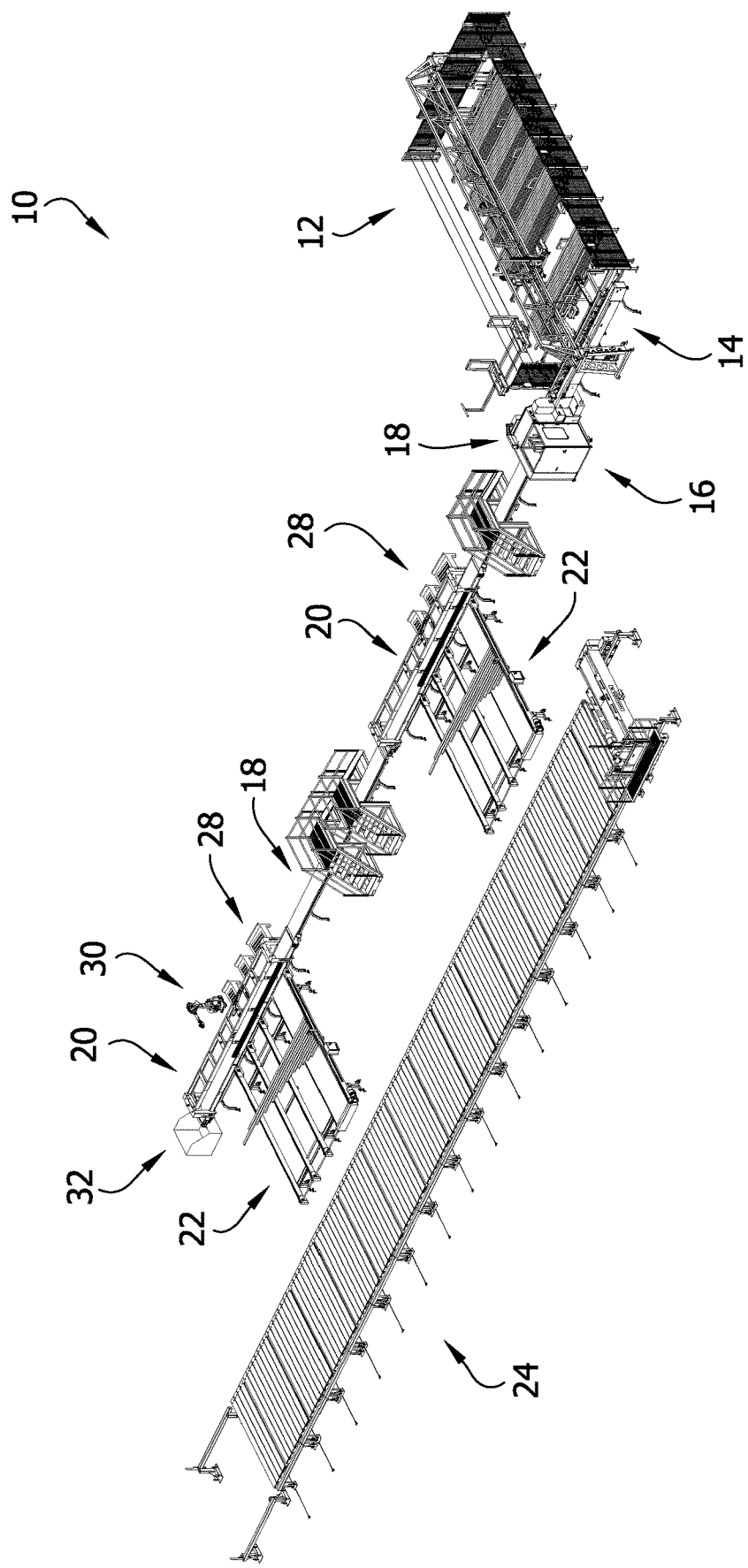
FIG. 1 is a rear perspective of one arrangement of a lumber cutting and delivery system according to the present invention.
Figure 2:
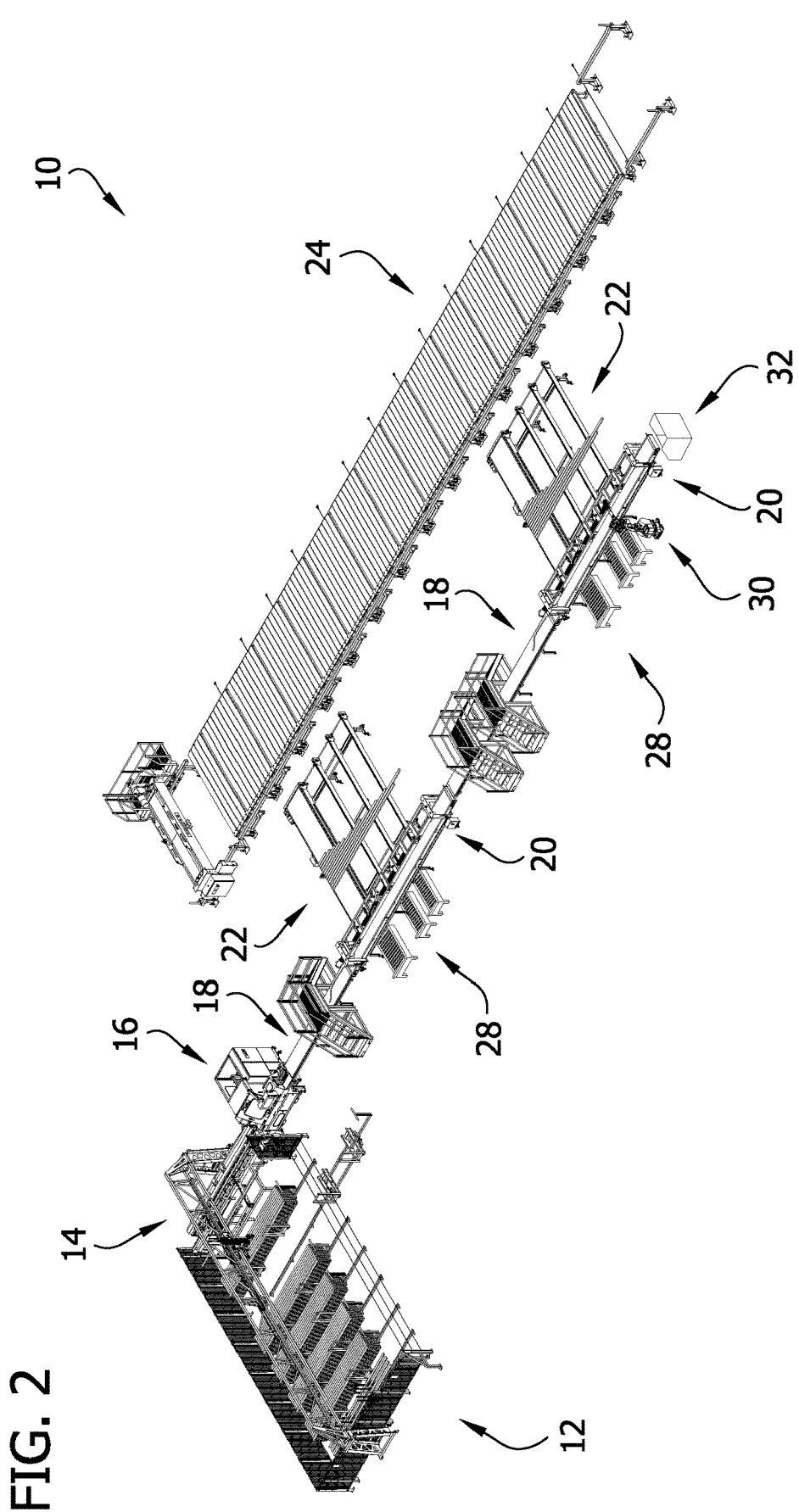
FIG. 2 is a front perspective thereof.
Figure 3:
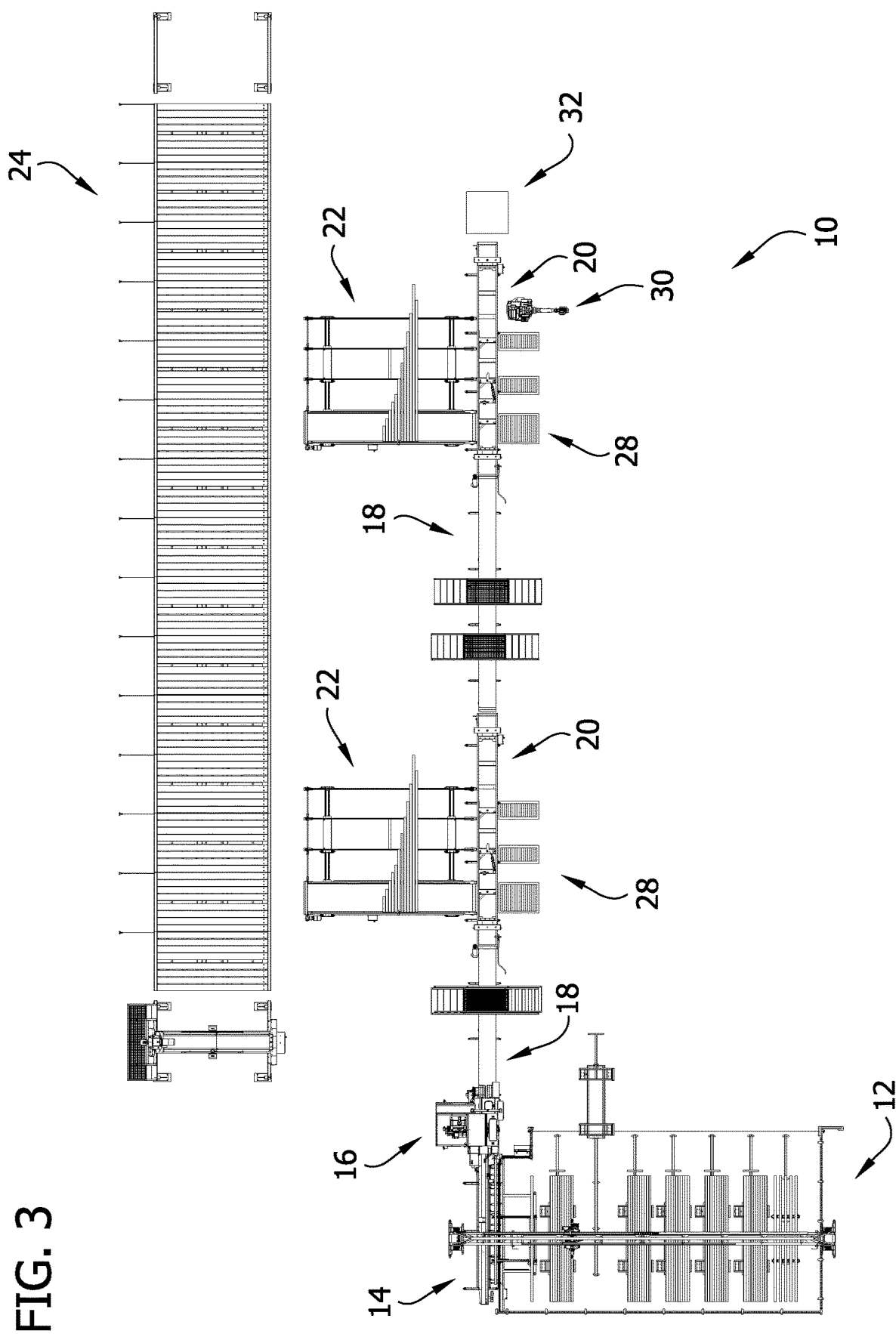
FIG. 3 is a top view thereof.
Figure 27:
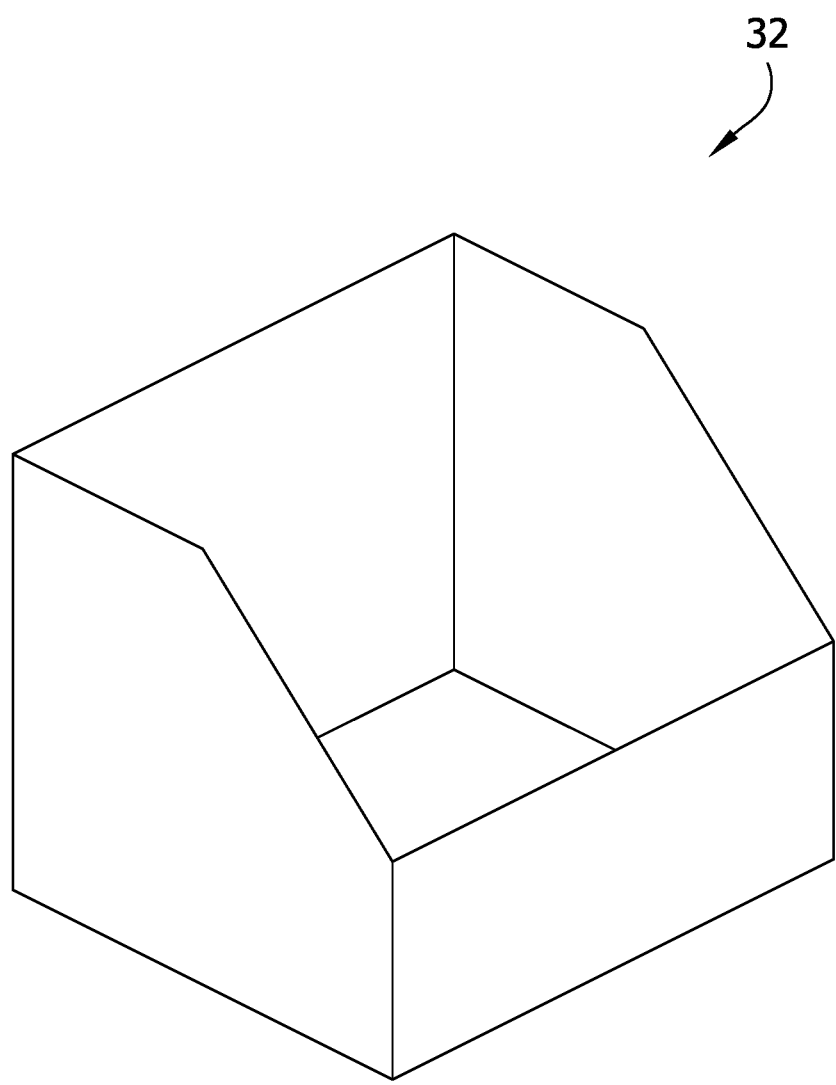
FIG. 27 is a perspective of a waste collection system.
Figure 28:
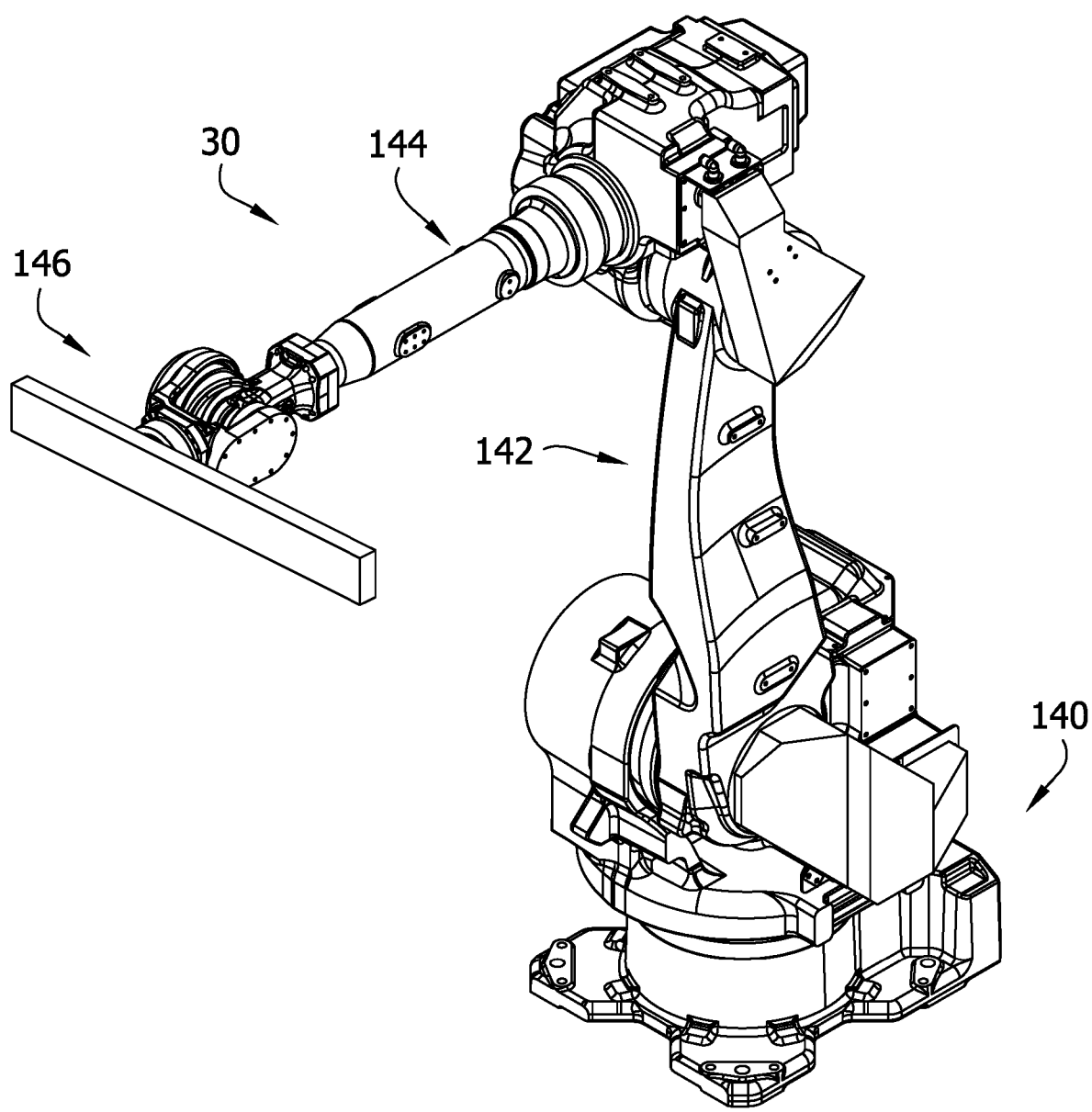
FIG. 28 is a perspective of a robotic cell.
Figure 29:
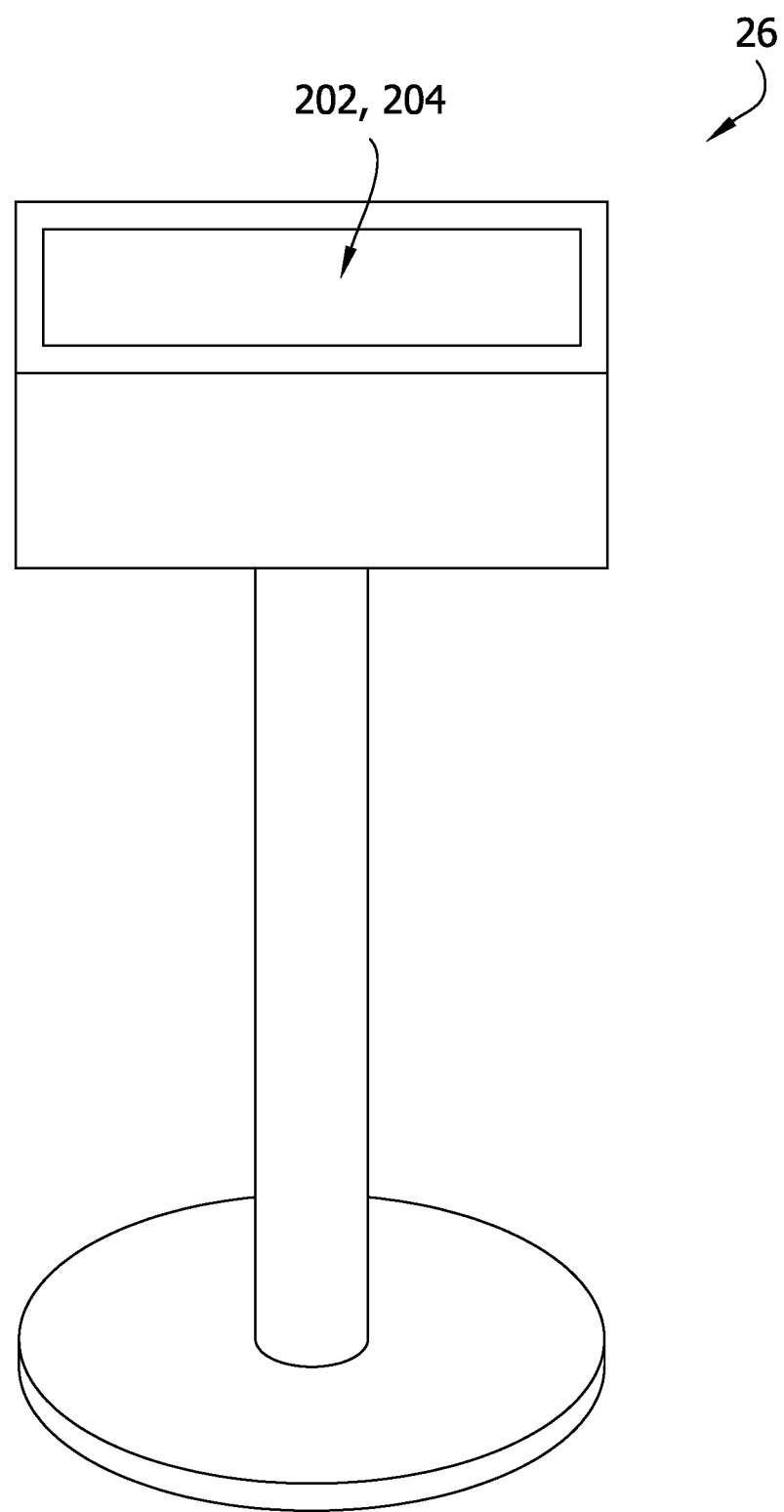
FIG. 29 is a perspective of a remote station.

Referring to FIGS. 1-3, an automated lumber cutting and delivery system or truss assembly line constructed according to the principles of the present invention is generally indicated at 10. The lumber cutting and delivery system 10 includes a loading system, generally indicated at 12, that is capable of picking lumber and placing it on an infeed conveyor, generally indicated at 14. Lumber or another material capable of being cut into pieces for use in forming a construct can be used. Although an automated loading system 12 is desirable, a semi-automated or entirely manual loading system could be used. The infeed conveyor 14 leads to a cutting system (e.g., saw), generally indicated at 16, that cuts the lumber according to predetermined instructions and discharges the pieces of cut lumber to a transition conveyor, generally indicated at 18 that feed the cut lumber components to a trunk conveyor system, generally indicated at 20. A branch conveyor system, generally indicated at 22, is located to one side of the trunk conveyor 20 and leads to a truss table, generally indicated at 24. As described more fully below, the lumber cutting and delivery system 10 can also include one or more of a remote station, generally indicated at 26 (FIG. 29), a stacker (not shown), a ramp assembly, generally indicated at 28 (FIG. 26), a robotic cell, generally indicated at 30 (FIG. 28), a waste collection system, generally indicated at 32 (FIG. 27), a culling station (not shown), and an automated guided cart (not shown) as well as additional truss tables 24, loading systems 12, infeed conveyors 14, cutting systems 16, transition conveyors 18, trunk conveyor systems 20 and branch conveyor systems 22 (see FIGS. 1-4). As explained in more detail below, the lumber cutting and delivery system 10 can contain any number of these components. The lumber cutting and delivery system 10 also includes a control system, generally indicated at 200 (FIG. 30), which controls the operation of the lumber cutting and delivery system (e.g., the operation of each component thereof).

The lumber cutting and delivery system 10 of the present invention is modular such that the components making up the system can be combined in varying arrangements as desired, as described in more detail below. Although the automated lumber and delivery system 10 is described herein in terms of constructing trusses, the system has application to the production of other items. For example and without limitation, the system could be used in the manufacture of walls and floor trusses. Accordingly, the lumber cutting and delivery system 10 can be configured to deliver cut pieces of lumber L to other pieces of manufacturing equipment, such as wall and floor truss manufacturing equipment, instead of or in combination with a truss table 24. In general, the lumber cutting and delivery system 10 may be used to deliver cut pieces of lumber to a location to create any lumber construct, particularly (but not exclusively) those which are joined together using nailing plates.

Figure 4:
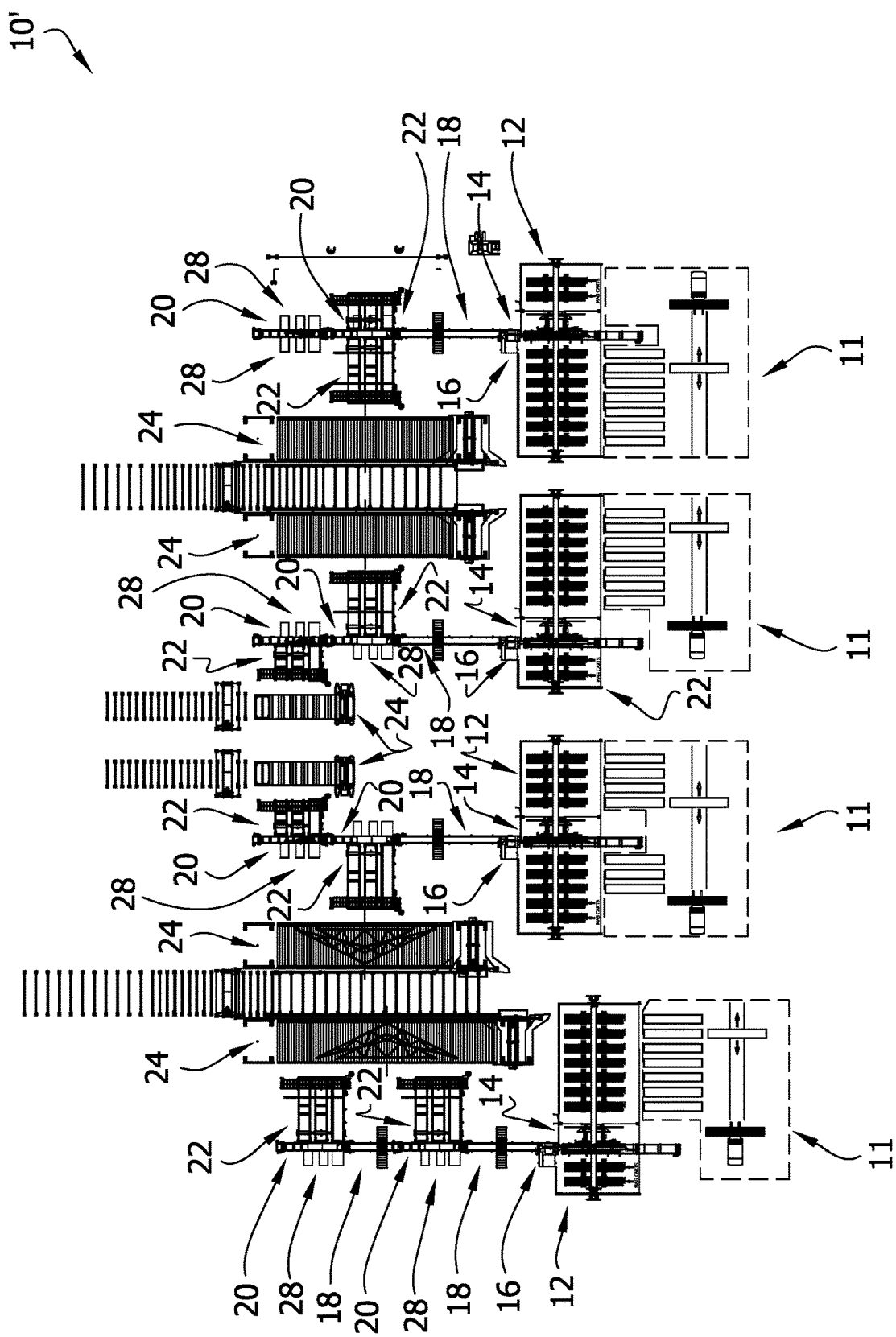
FIG. 4 is a plane view of another arrangement of a lumber cutting and delivery system according to the present invention.
Figure 5:
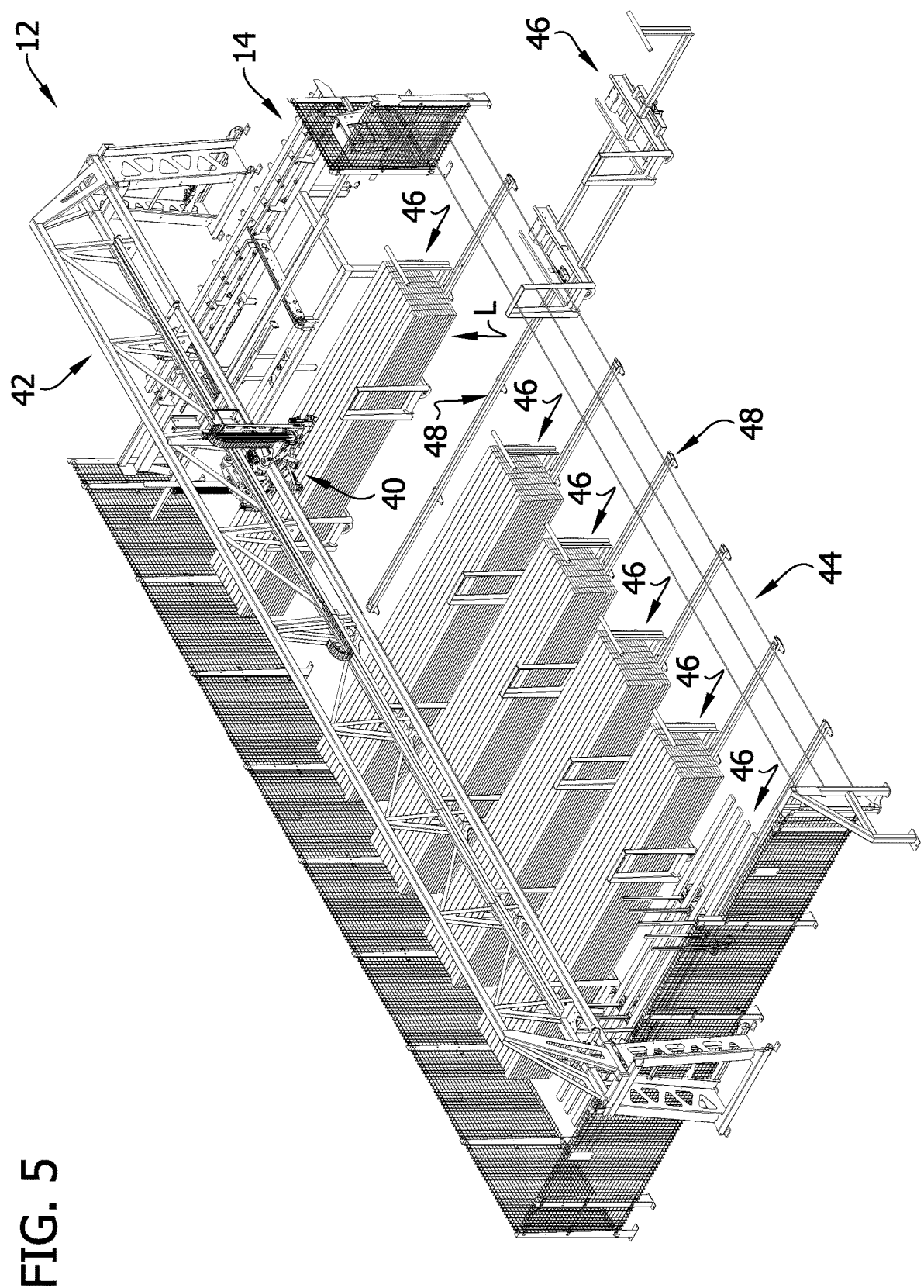
FIG. 5 is a front perspective of a loading system and an infeed conveyor according to the present invention.
Figure 6:
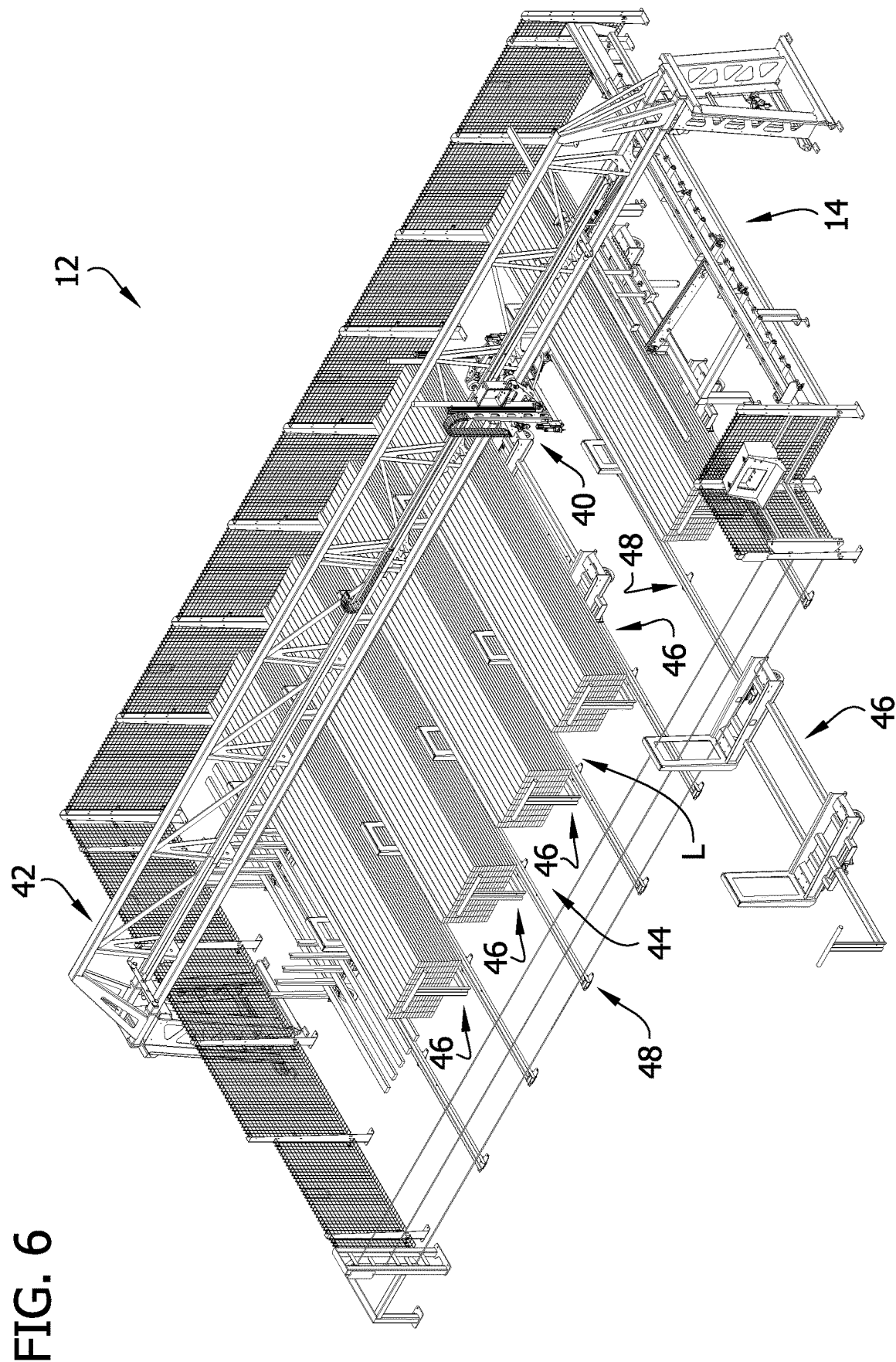
FIG. 6 is a front perspective of the loading system and infeed conveyor from another side.
Figure 7:
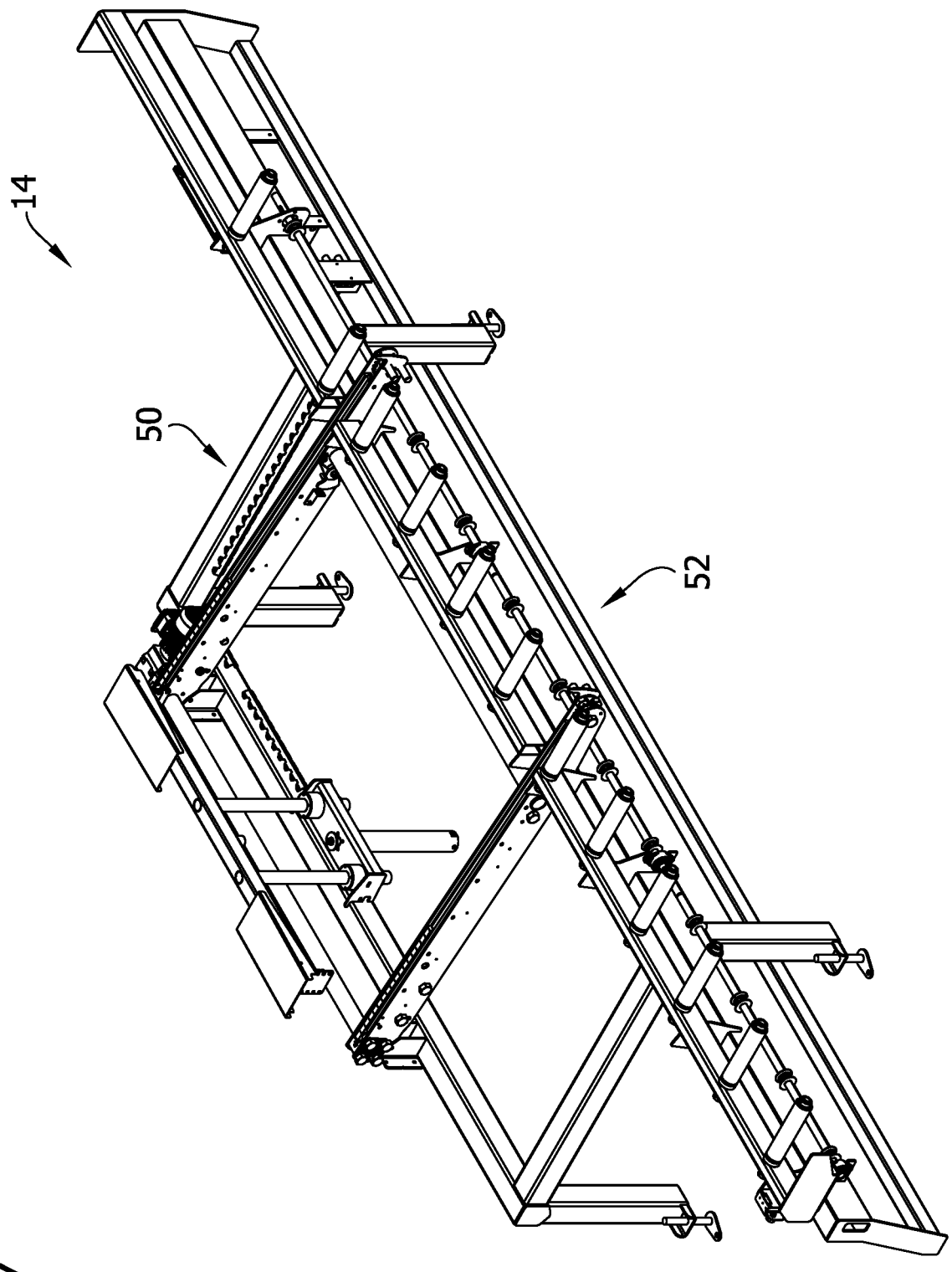
FIG. 7. is a perspective of the infeed conveyor.
Figure 8:
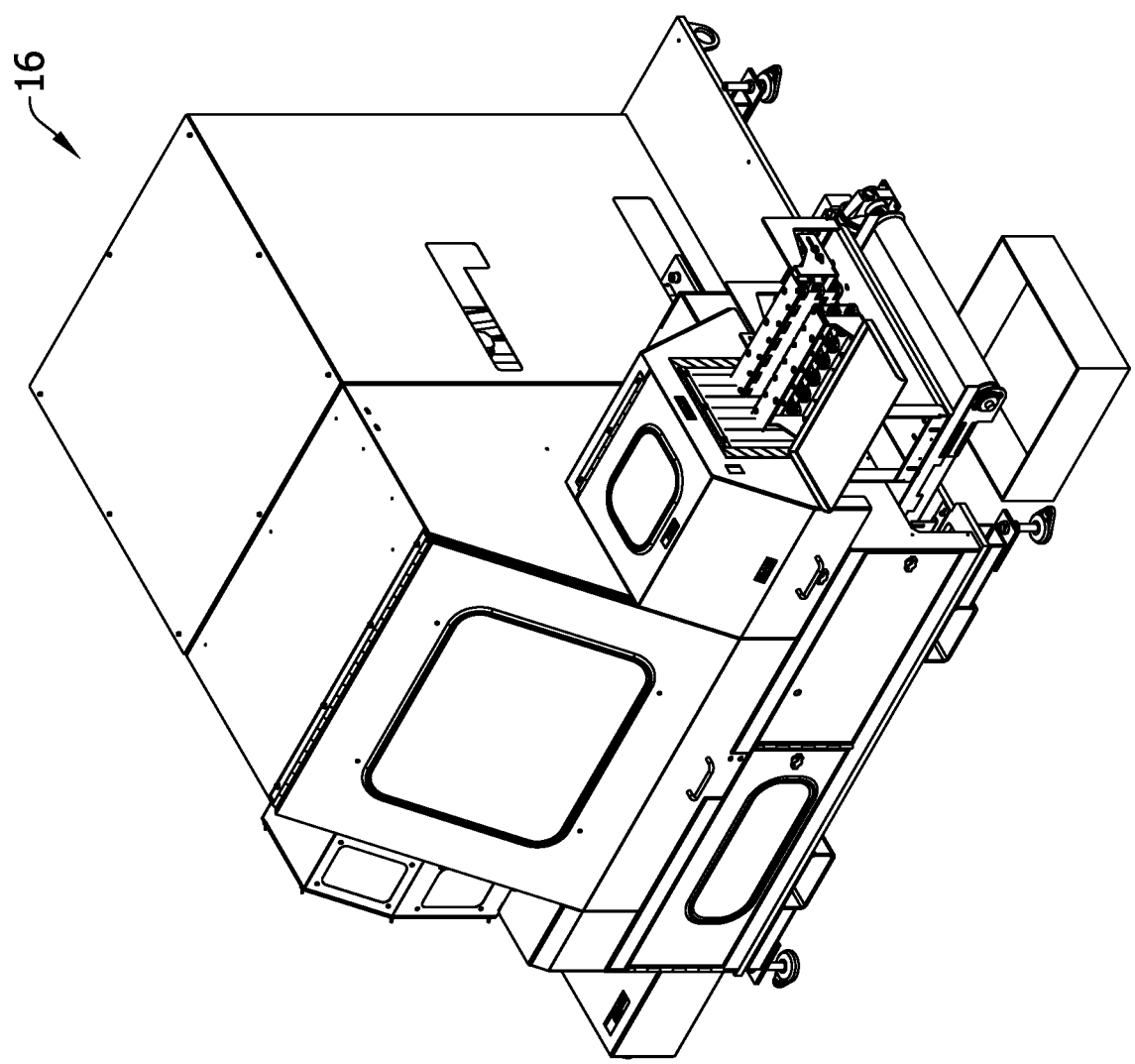
FIG. 8 is a perspective of a cutting system.

Referring to FIGS. 5 and 6, the loading system 12 generally includes a pick up arm 40 movably connected to a gantry 42 and a storage area 44. The storage area 44 includes at least one bunk 46 located beneath the gantry 42 and configured to hold one or more sizes of lumber L in a stacked arrangement. Preferably, a plurality of bunks 46 are located beneath the gantry 42, each able to store one or more sizes of lumber L in a stacked configuration. This way, the lumber cutting and delivery system 10 can access a variety of different lumber L sizes that may be needed to create trusses of varying sizes and construction with the most efficient use of lumber. The bunks 46 can be movable to allow for easier loading of lumber L. For example, the bunk 46 is supported by wheels and configured to slide along a track 48 such that when the bunk is empty, the bunk can be moved from underneath the gantry 42, loaded with lumber L and then moved back underneath the gantry. By following the track 48, the bunk 46 can be placed in the same position underneath the gantry 42 after the bunk has been loaded with lumber L. In one embodiment, the loading system 12 includes additional bunks 46 located outside the gantry 42 and in-line with the bunks beneath the gantry (FIG. 4). The bunks 46 located outside the gantry 42 can be pre-loaded with lumber L so that once a bunk located beneath the gantry is empty, the empty bunk can be quickly replaced by the pre-loaded bunk. In addition, these additional bunks 46 may be movable between lines such that the additional bunks can be moved in-line with any of the bunks located beneath the gantry (see FIG. 4). In this manner, the lumber cutting and delivery system 10 can stage a large amount of lumber L to feed the system and an operator can quickly and easily load the staged lumber into the loading system 12 once a bunk 46 is empty. In one embodiment, each bunk 46 may be coupled to an automated guide cart (not shown), described below, which can automatically remove the empty bunk and move the pre-loaded bunk into position. In another embodiment, each bunk may itself be configured as an automated guide cart. "Boards", "lumber", "lumber members" and "pieces of lumber" are intended to be interchangeable herein unless the context clearly indicates the contrary.

The loading system 12 is configured to transport the pieces of lumber L from the storage area 44 to the infeed conveyor 14. The pickup arm 40 is movable along the length of the gantry 42 and can extend below the gantry to reach the lumber L stored in the bunks 46. The pickup arm 40 uses suction to pick up a piece of lumber L from the bunk 46. Once the pickup arm 40 grabs a piece of lumber L, the pickup arm moves along the length of the gantry 42 and places the lumber on the infeed conveyor 14. The loading system 12 can also include sensors capable of detecting the amount of lumber L contained in the bunk 46 and convey that information to a control system 200. When the amount of lumber L in the bunk 46 is low, the sensors convey that information to the control system 200. The control system 200 can then send a signal to an operator indicating the need to load more lumber L onto the bunk 46 or replace the empty bunk with a pre-loaded bunk (manually or automatically). The control system 200 can also contain an inventory of the lumber L contained in the bunk 46 and display the inventory to the operator. An example of a suitable loading system 12 is the Ranger RS™ lumber retrieval system available from Acer Inc.

In one embodiment, the lumber cutting and delivery system 10 may include a culling station (not shown) before the loading system 12. The culling station is configured to analyze pieces of lumber L received in a lumber shipment before the pieces of lumber are moved into the bunks. The culling station is configured to sort the pieces of lumber L into usable (e.g., good) pieces of lumber and unusable (e.g., bad) pieces of lumber. In practice, generally, up to 25% of the lumber L received in a lumber shipment may be unusable. Usable pieces of lumber L can be used to construct a wooden truss or other constructs and can be fed into the subsequent components of the lumber cutting and delivery system 10. Unusable pieces of lumber L contain one or more defects which prevent the piece of lumber from being suitable to build a wooden truss and/or fed into the subsequent components of the lumber cutting and delivery system 10. For example, pieces of lumber L may be defective and unusable because the piece of lumber is chamfered, twisted, bowed, missing chunks, cracked, severely knotted, etc. The culling station includes sensors, such as cameras, that scan each piece of lumber L as the lumber is fed into the culling station. In one embodiment, the culling station may be configured to automatically remove pieces of lumber L from a lumber shipment (e.g., debunk the lumber) and feed the lumber into the culling station. In other embodiments, this may be done manually by an operator. The culling station and/or the control system 200 analyzes the data from the sensors and determines if the scanned piece of lumber L is usable or unusable. If the piece of lumber L is usable, the culling station can direct the usable piece of lumber to a usable lumber pile. If the piece of lumber L is unusable, the culling station can direct the unusable piece of lumber to an unusable lumber pile. The usable piece of lumber L can then be transferred to the bunks 46 of the loading system 12. This can be done manually by an operator or automatically using the automated guided carts described herein. The culling station can position and/or arrange the usable and unusable pieces of lumber L so that they are easily transportable, for example by stacking the pieces of lumber on a cart (automated or manual) or a pallet. The culling station can be connected to the control system 200 and may send and receive signals (e.g., instructions, operational data, etc.) to and from control system 200.

Referring to FIGS. 4-7, the infeed conveyor 14 receives the lumber L from the loading system 12 and transports the lumber L to the cutting system 16 for cutting. The infeed conveyor 14 has a transverse conveyor portion 50 and a longitudinal conveyor portion 52. The transverse conveyor portion 50 receives the lumber L from the pickup arm of the loading system 12 and transports the lumber in a direction that is transverse to the lumber's longitudinal axis to the longitudinal conveyor portion 52. The longitudinal conveyor portion 52 is aligned with the cutting system 16 and transports the lumber L in a longitudinal direction parallel to the lumber's longitudinal axis, to the cutting system. Further details of infeed conveyors 14 may be found in U.S. Pat. No. 7,011,006, incorporated herein by reference. The infeed conveyor 14 may also contain an orienter which orients each piece of lumber L in a desired configuration. For example, lumber L is often bowed or curved over its length. The orienter positions each piece of lumber L received on the infeed conveyor 14 such that the bow is always facing the same direction. In other embodiments, the lumber cutting and delivery system 10 may not include a loading system 12. In this embodiment, the pieces of lumber L may be manually loaded onto the transverse conveyor portion of the infeed conveyor 14 by an operator or a robotic cell 30, as discussed below, may be used to load the pieces of lumber. The infeed conveyor 14 may also include a sensor configured to detect the width of the piece of lumber L in order to confirm the piece of lumber being delivered to the cutting system 16 is the correct width.

Figure 9:
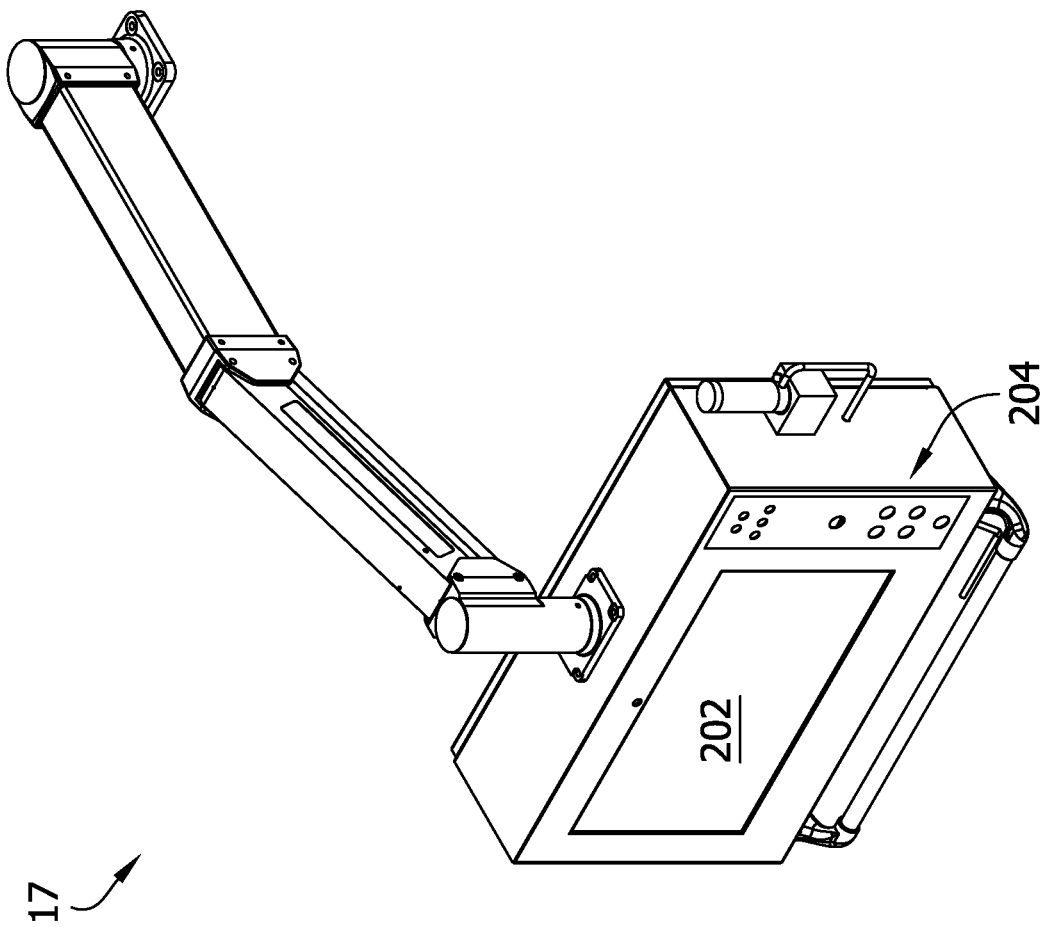
FIG. 9 is a perspective of a human-machine interface of the cutting system.
Figure 10:
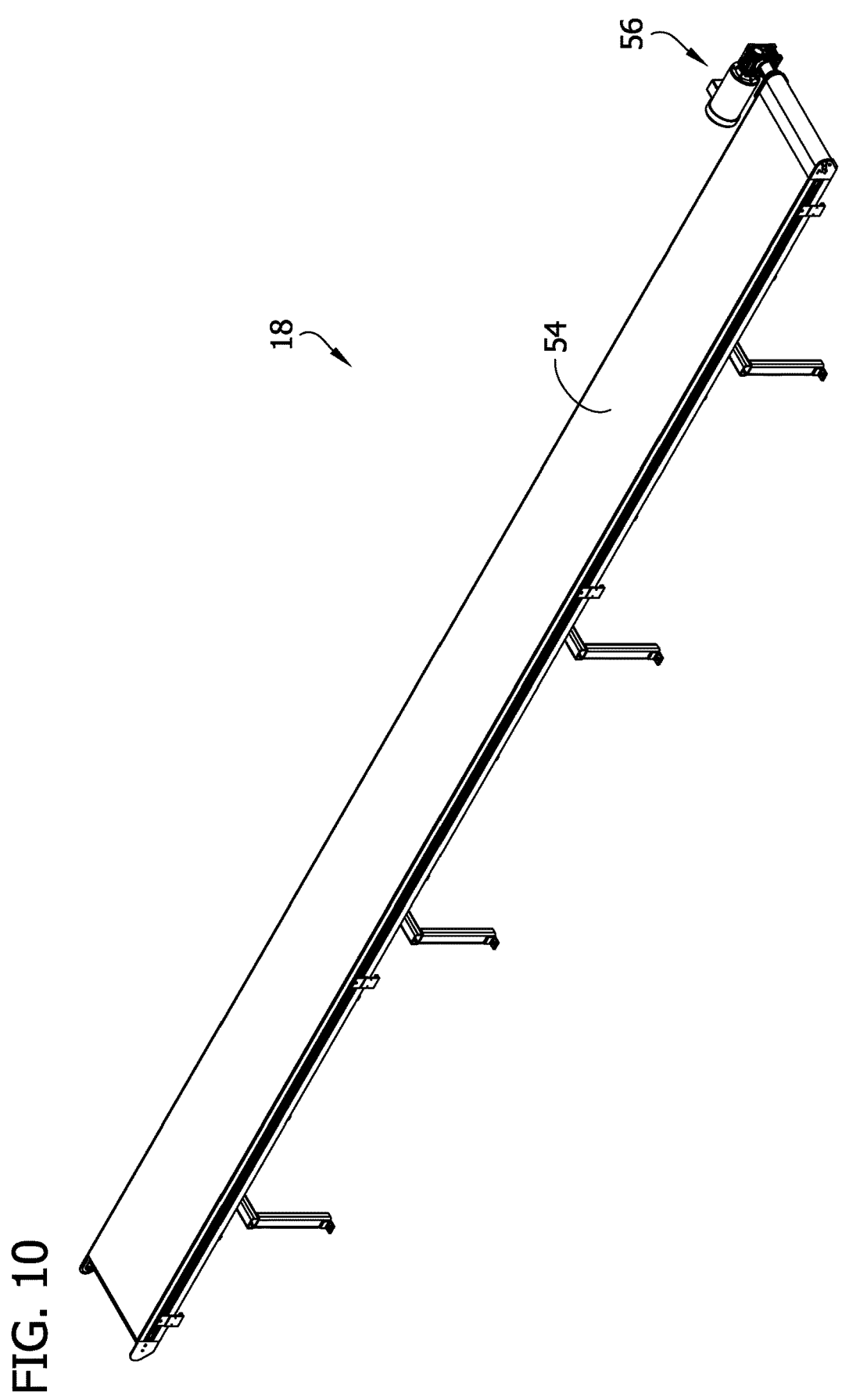
FIG. 10 is a perspective of a transition conveyor.
Figure 11:
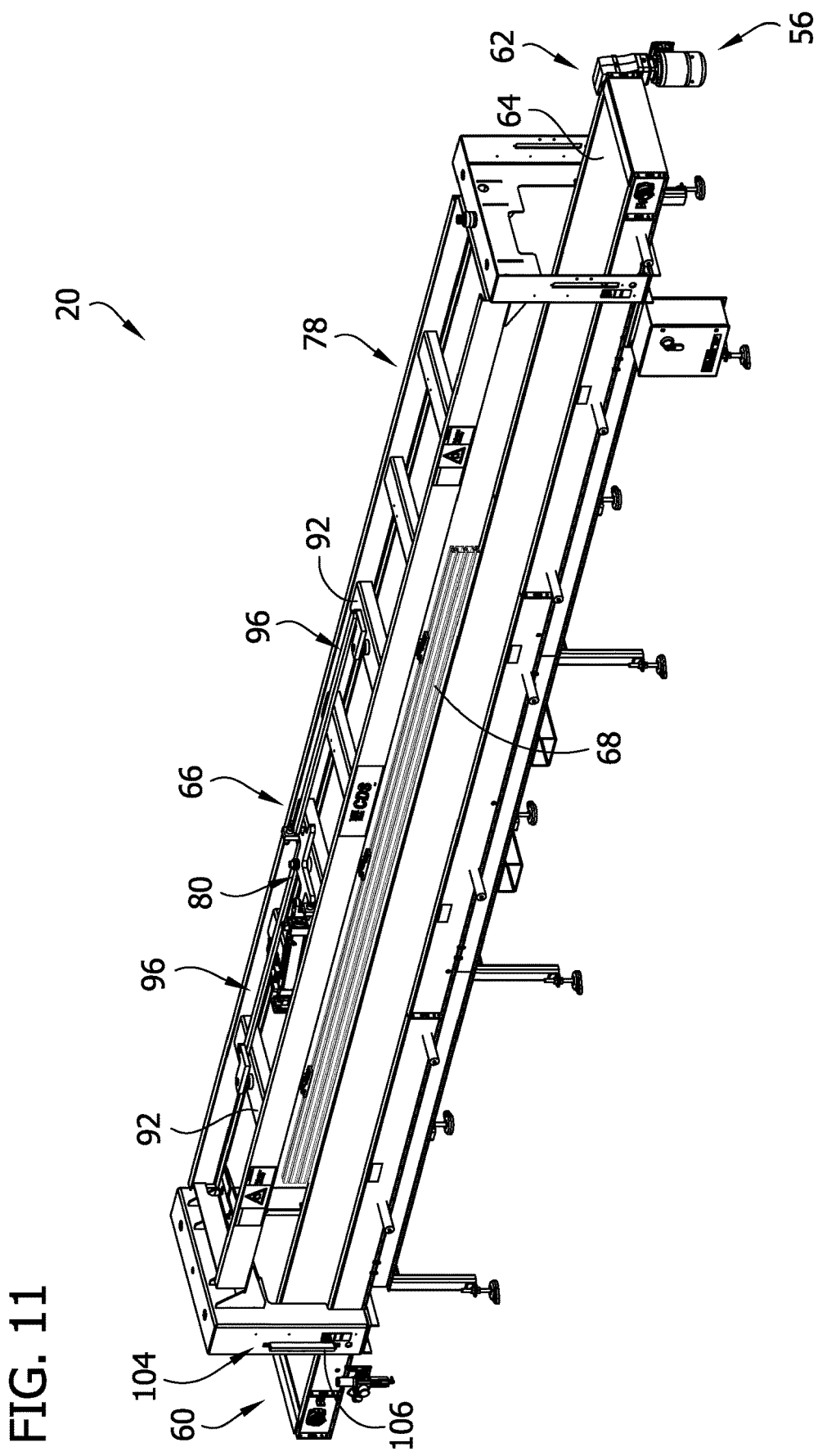
FIG. 11 is a rear perspective of one embodiment of a trunk conveyor system.
Figure 12:
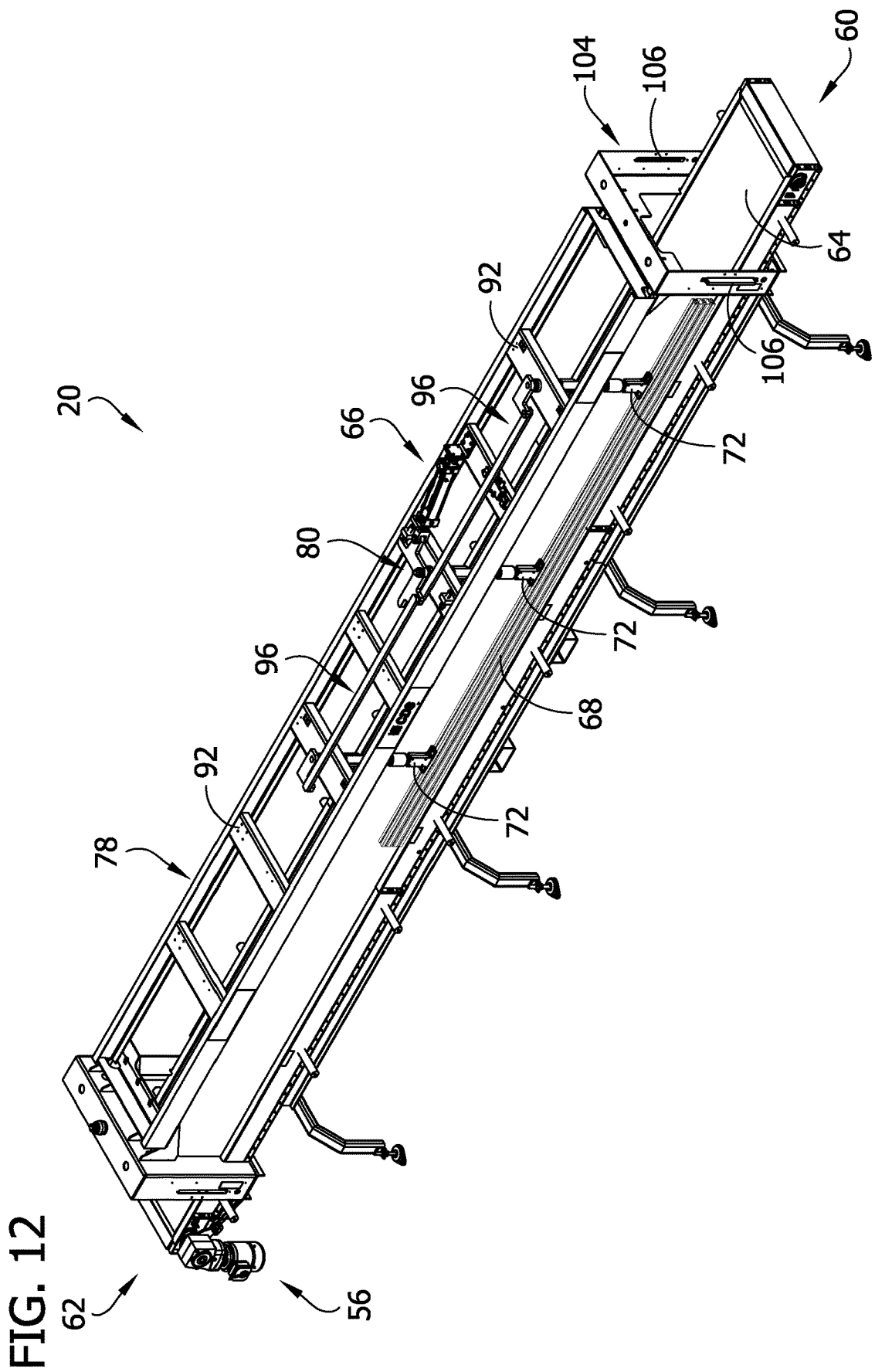
FIG. 12 is a front perspective thereof.
Figure 13:
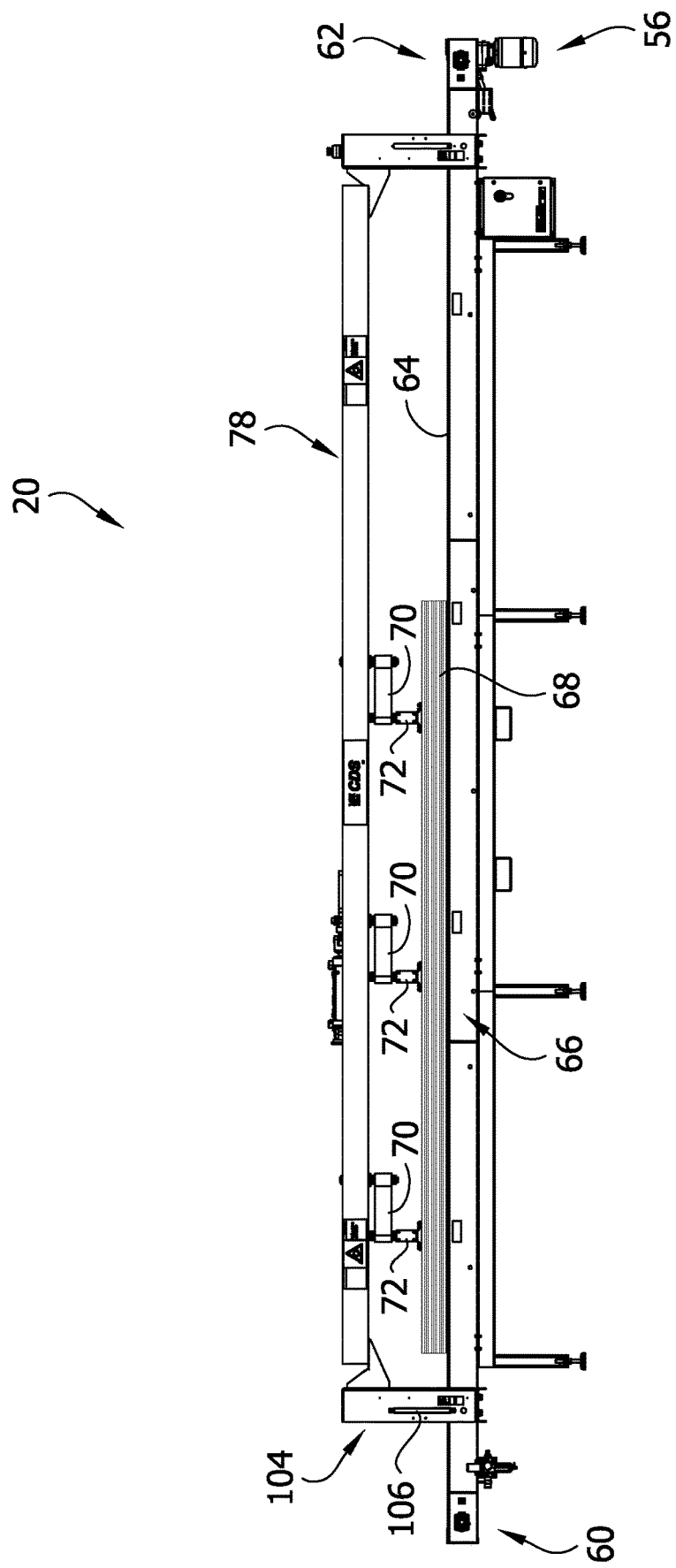
FIG. 13 is a side view thereof.

Referring to FIGS. 1-4, 8 and 9, the cutting system 16 receives the lumber L from the infeed conveyor 14 and cuts the piece of lumber to form the desired truss member. For example, the cutting system 16 may receive data from a production software of the control system 200, described in more detail below. The data can be used by the cutting system 16 to cut the pieces (e.g., truss members) used to construct a particular truss or other construct. As shown in FIG. 9, the cutting system 16 includes a human-machine interface 17 which can be mounted on the cutting system and allows the operator or production manager to interface with the cutting system, as described in more detail below. The cutting system 16 cuts the lumber L to the desired length with the desired angled miter cuts on each end to form the truss member. The cutting system 16 generally includes a multi-position saw capable of cutting a piece of lumber L at any angle, a gripping assembly capable of securing the lumber when it is being cut, and an discharge system capable of moving the lumber out of the cutting system 16. The cutting system 16 may also include a printer that can mark the lumber L on one or more sides. The printer can mark the lumber L with identification information so that the operator and/or subsequent components of the lumber cutting and delivery system 10 can identify the cut piece of lumber. The printer can also mark the lumber L to show connector (e.g., nailing) plate locations. Once the lumber L is cut by the cutting system 16 in the desired configuration to form the truss member, the truss member is then transported out of the cutting system by the discharge system. In the illustrated embodiments (FIGS. 1-4), the cutting system 16 moves the cut pieces of lumber L (e.g., truss members) onto a transition conveyor 18. One example of a suitable cutting system 16 is the MatchPoint BLADE™ wood processing system from MiTek Industries, Inc.

When cutting truss members from the lumber L, the truss members are generally a different length than that of the lumber. Thus, the cutting of the truss member from the lumber L results in a leftover segment of lumber. This leftover segment of lumber L is also transported out of the cutting system 16 by the discharge system. The leftover segment of lumber is classified as either waste or remainder. The leftover segment is waste if it is too short to be used to form a truss member. Waste is generally discarded by the operator. The leftover segment is remainder if it is long enough to be cut again to form a truss member. Remainder is generally collected and fed back into the lumber cutting and delivery system 10 by the operator to be cut into a truss member for use in a truss. The operator and/or the control system 200 makes the waste/remainder determination for the leftover segment. "Truss member", "waste" and "remainder" are all a subset of "lumber" and are intended to be interchangeable with "lumber" or a similar term as described above unless the context clearly indicates the contrary.

Referring to FIGS. 1-4 and 10, the transition conveyor 18 transports the lumber L, which can be classified as a truss member, waste or remainder, to the trunk conveyor system 20. The transition conveyor 18 includes a transition conveyor belt 54 (broadly, "conveying element") positioned next to the cutting system 16. The transition conveyor belt 54 receives the lumber L from the discharge system and transports the lumber to the trunk conveyor system 20. The transition conveyor 18 includes a motor 56 (e.g., electric motor) operative coupled to the transition conveyor belt 54 and configured to drive movement of the transition conveyor belt. As explained in more detail below, the transition conveyor belt 18 is connected to and controlled by the control system 200.

Referring to FIGS. 11-19, the trunk conveyor system 20 has a front end 60 positioned to receive the lumber L from the transition conveyor 18 and a rear end 62. It will be understood that the trunk conveyor system 20 could receive lumber L directly from the cutting system 16 (or other component), or additional equipment (not shown) may be interposed between the branch conveyor system 22 and the cutting system within the scope of the present invention. The trunk conveyor system 20 includes a first conveyor belt 64 (broadly, "conveying element") spanning between the front and rear ends 60, 62 and positioned to receive the lumber L and transport the lumber over a desired distance. The trunk conveyor system 20 also includes an ejector 66, capable of pushing the piece of lumber L off of either side of the first conveyor belt 64. In the illustrated embodiment, the ejector 66 is a movable swing arm positioned above the first conveyor belt. It is to be understood that other ejectors than described herein, such as conveyor having diverter system using multiple rollers, are within the scope of the present invention. For example, the ejector could be a series of rollers that swing at the desired angle to direct the pieces of lumber L off either side of the first conveyor belt or a linearly movable push bar that pushes the pieces of lumber L off either side. The trunk conveyor system 20 includes a motor 56 (e.g., electric motor) operative coupled to the first conveyor belt 64 and configured to drive movement of the first conveyor belt.

Figure 16:
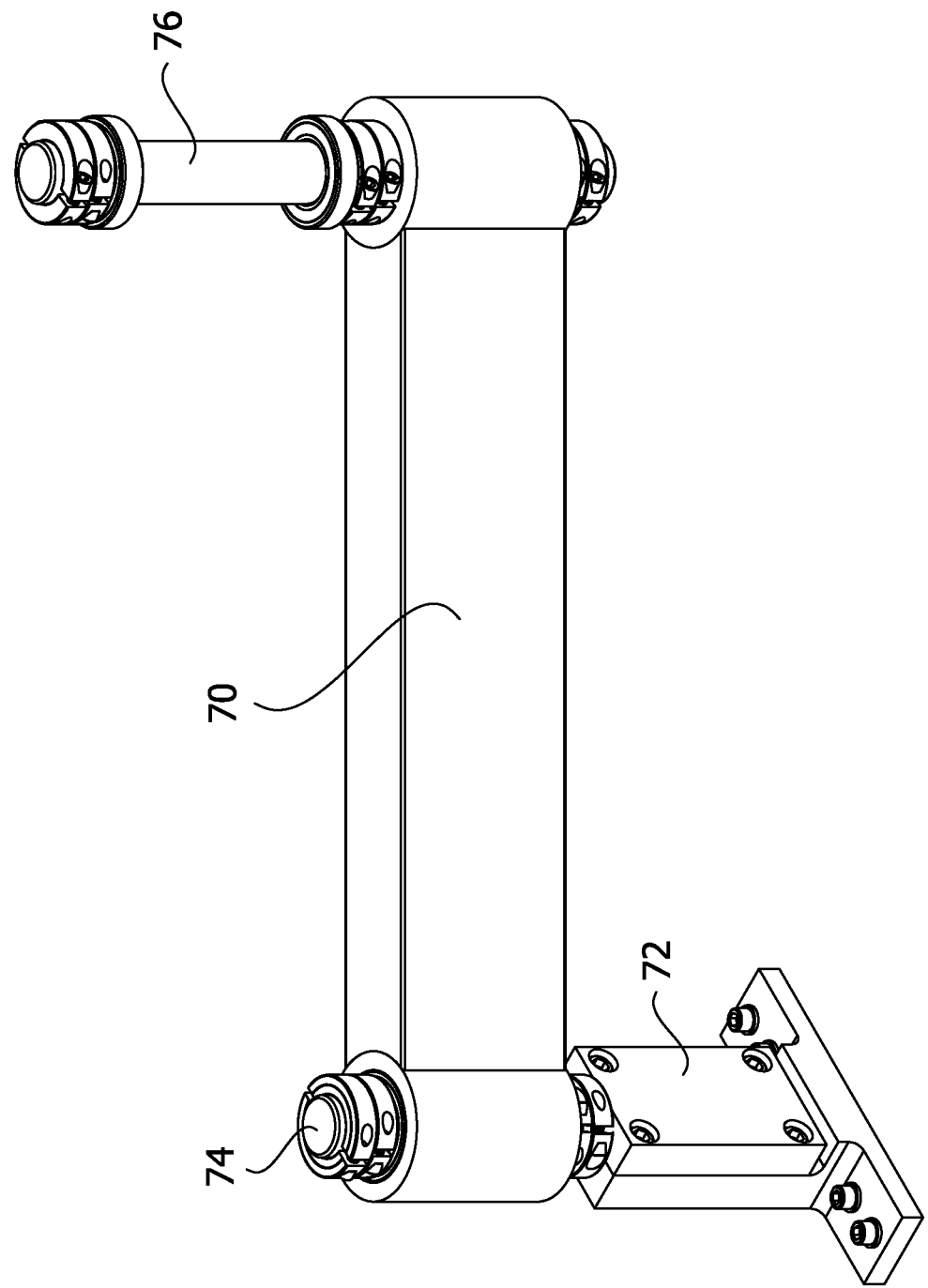
FIG. 16 is an enlarged perspective of a rotating member, connector bracket and shaft of the swing arm.

The swing arm 66 includes an elongated pusher bar 68 and at least one rotating member 70. The elongated pusher bar 68 is in a parallel configuration with the first conveyor belt 64 and positioned just above the first conveyor belt such that the bar can come into contact with the lumber L resting on the first conveyor belt. Each rotating member 70 has a first end portion and a second end portion. The first end portion of each rotating member is pivotally connected to the pusher bar 68 with a connector bracket 72 and a pin 74. The connector bracket 72 is secured to the top of the pusher bar 68. The pin 74 is secured to and extends from the connector bracket 72 into a hole in the first end portion of the rotating member 70 (FIG. 16). The pin 74 is coupled to the first end portion of the rotating member 70 such that the pin is free to rotate in the hole while the rotating member supports the weight of the pusher bar 68 (or a portion thereof if there are multiple rotating members). The second end portion of each rotating member 70 is secured to a shaft 76 for conjoint movement with the shaft. The shaft 76 is rotatably connected to a frame 78 of the trunk conveyor system 20 positioned above the first conveyor belt 64. More specifically, the shaft 76 is connected to the frame 78 at a location generally above the center line in the longitudinal direction of the first conveyor belt 64. Preferably, at least two rotating members 70 connect the bar 68 to the frame 78.

Figure 17:
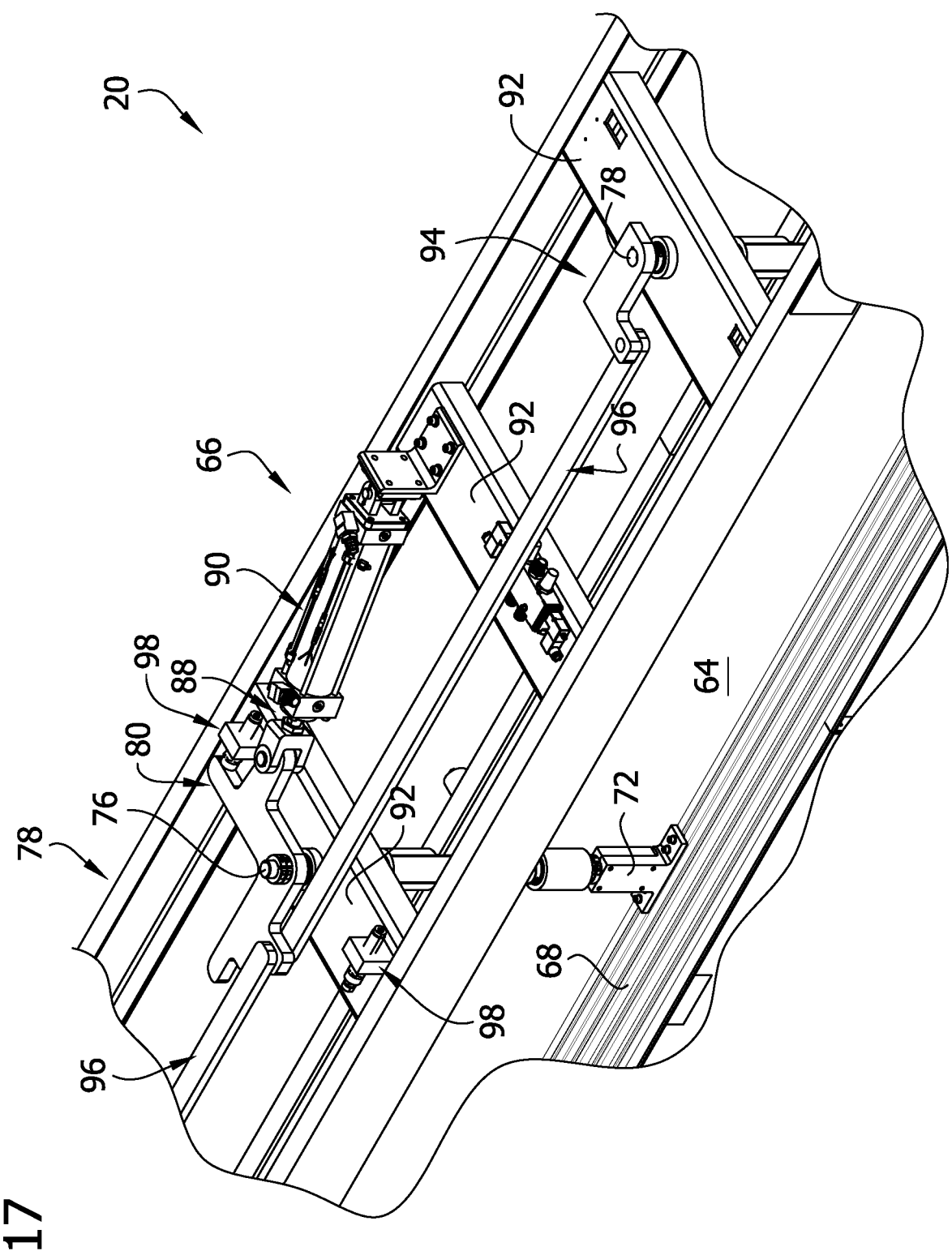
FIG. 17 is an enlarged, fragmentary perspective of the trunk conveyor system.
Figure 18:
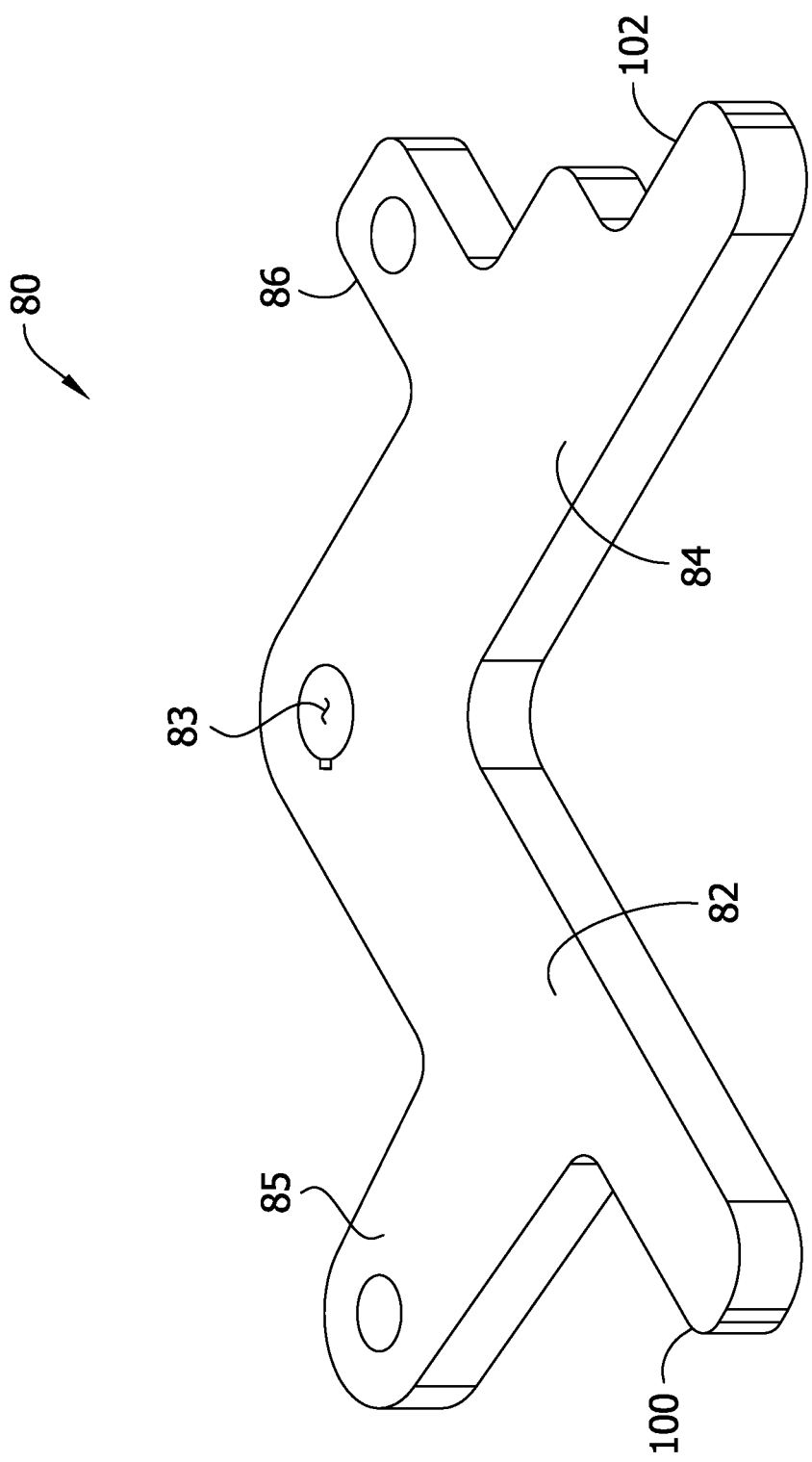
FIG. 18 is a perspective of one embodiment of a bracket.
Figure 19:
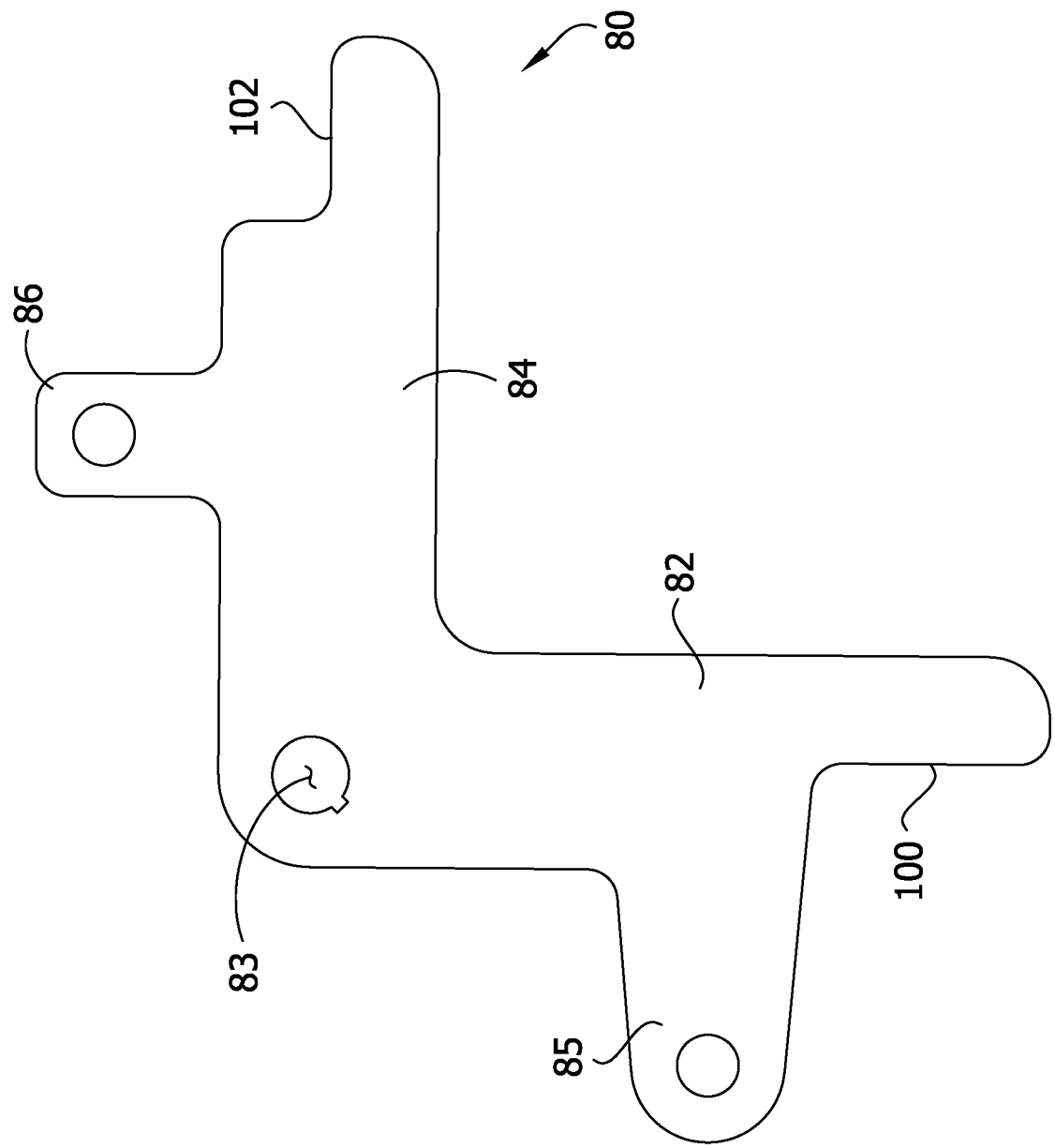
FIG. 19 is a top view thereof.

The shaft 76 of one of the rotating members 70, the middle rotating member in the illustrated embodiment, is connected to a rotation bracket 80 (FIG. 17). The rotation bracket 80 includes a first portion 82, a second portion 84 extending from the first portion in a direction that is transverse to the first portion and a third portion 86 extending from the second portion in a direction that is generally parallel to the first portion. The rotation bracket 80 defines an opening 83 configured to receive a shaft and connect the rotation bracket to the shaft at the intersection of the first and second portions 82, 84 such that rotation of the rotation bracket 80 rotates the shaft. A connector tab 85 extends from an intermediate part of the first portion 82 in a direction that is transverse to the first portion and generally opposite the direction in which the second portion extends. The connector tab 85 is pivotably connected to an end of a piston 88 of a linear actuator 90 capable of extending and retracting the piston a set distance in a linear direction. The linear actuator 90 is mounted on the frame 78 of the trunk conveyor system 20 (FIG. 17) to pivot with respect to the frame. As the linear actuator 90 extends the piston 88, the rotation bracket 80 is rotated about the shaft 76, turning the shaft and moving the bar 68 of the swing arm 66 toward the second side of the first conveyor belt. As the linear actuator 90 retracts the piston 88, the rotation bracket 80 is rotated in the opposite direction, turning the shaft 76 the opposite direction and moving the pusher bar 68 of the swing arm 66 toward the first side of the first conveyor belt 64. As the swing arm 66 sweeps across the first conveyor belt 64 from one side toward the other, any lumber L located on the first conveyor belt is pushed off either the first or second side of the first conveyor belt. Thus, the swing arm 66 can push the lumber L off the first side of the first conveyor belt 64 in a first direction that is transverse to the first conveyor belt. Likewise, the swing arm 66 can push the lumber L off the second side of the first conveyor belt 64 in a second direction that is transverse to the first conveyor belt and opposite the first direction.

Figure 14:
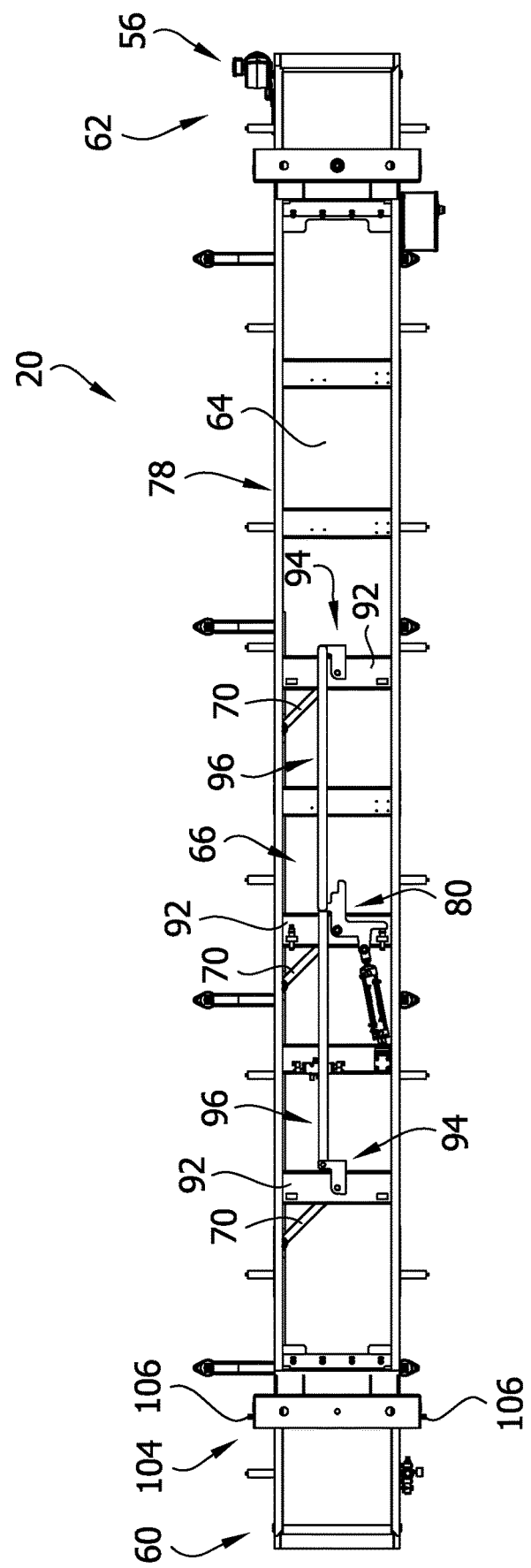
FIG. 14 is a top view thereof.
Figure 15:
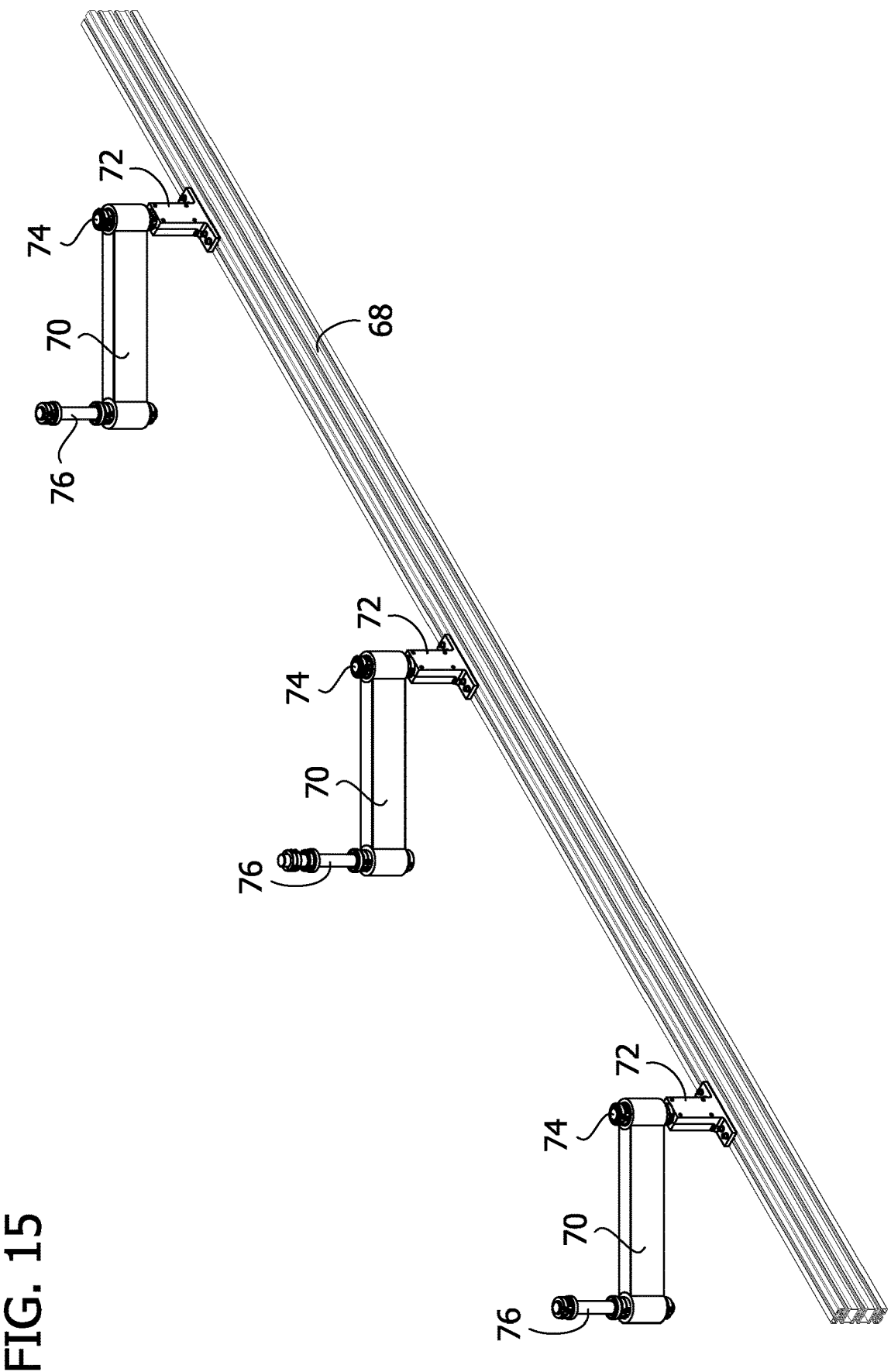
FIG. 15 is a perspective of a swing arm of the trunk conveyor system.

Referring particularly to FIGS. 14 and 17, the shafts 76 not connected to the rotation bracket 80 are each pivotably mounted on a respective cross member 92 of the frame 78 and are each secured to an end of an L-shaped bracket 94 for conjoint rotation with the L-shaped bracket. An opposite end of the L-shaped bracket 94 is pivotably connected to a shaft bar 96. Each shaft bar 96 spans between the L-shaped bracket 94 and the rotation bracket 80 and is pivotably connected to the L-shaped bracket and a third portion 86 of the rotation bracket. The shaft bar 96 can span between two L-shaped brackets 94, an L-shaped bracket and a rotation bracket 80 or any combination of L-shaped brackets and rotation brackets. There can be multiple shaft bars 96 each spanning between adjacent L-shaped and rotation brackets 94, 80 or a single bar spanning between and across all the L-shaped and rotation brackets, or any combination thereof. For example, in the illustrated embodiment, there are three shafts 76 corresponding to three rotating members 70 positioned along the frame 78. The middle shaft 76 is connected to the rotation bracket 80 and the two end shafts are connected to L-shaped brackets 94. The first shaft bar 96 spans between the L-shaped bracket 94 of one end shaft 76 to the rotation bracket 80 and the second shaft bar spans between the L-shaped bracket of the other end shaft to the rotation bracket. This links all the shafts 76 together such that the rotation of the rotation bracket 80 by the piston 88 conjointly rotates the L-shaped brackets 94 of the shafts located on each end. Accordingly, the shaft bars 96 operatively connect the end shafts 76 to the rotation bracket 80 and the linear actuator 90. Thus, with this linking arrangement, the rotation bracket 80 can impart a force on every shaft 76 in unison to move the bar 68 of the swing arm 66 from one side to the other side of the first conveyor belt 64.

Stops 98 can also be positioned on the frame 78 to engage the rotation bracket 80 at set positions to stop the rotation of the rotation bracket (FIG. 17). The stops 98 prevent the rotation bracket 80 from over rotation. The stops 98 are set to engage the rotation bracket 80 such that the bar 68 of the swing arm 66 is positioned on a respective one of the first and second sides of the first conveyor belt 64 when the rotation bracket engages one of the stops. More specifically, a free end of the first portion 82 opposite the opening 83 has a side engagement surface 100 configured to engage the stop to prevent over rotation when the linear actuator retracts the piston. Likewise, a free end of the second portion 84 opposite the opening 83 has a side engagement surface 102 configured to engage another stop 98 to prevent over rotation when the linear actuator 90 extends the piston 88. In one embodiment, the trunk conveyor system 20 includes a cover (not shown) connected to the frame 78 and covering the shaft bars 96, L-shaped brackets 94, rotation bracket 80, stops 98 and linear actuator 90.

In one embodiment of the trunk conveyor system 20 (not shown), the rotation bracket 80 imparts a force only on a single shaft 76 to move the swing arm 66. In this embodiment, the rotation bracket is connected only to the single shaft 76 of a rotation member 70 and the linear actuator 90. No shaft bars 96 are used to connect the shafts 76 of additional rotation members 70 with the rotation bracket. In this embodiment, a rotation bracket may not include the third portion 86 of the rotation bracket 80. In this embodiment, when rotated by the linear actuator 90, as described above, the rotation bracket rotates the shaft 76 to move the bar 68 of the swing arm 66 from one side of the first conveyor belt 64 to the other as described above. In this arrangement, any additional rotating members 70 provide support for the bar 68. In this embodiment, it is appreciated that only one shaft 76 has force applied to rotate and move the swing arm 66. The shafts 76 of any additional rotating members 70 rotate as a response to the rotation of the swing arm 66 and do not apply any force to rotate the swing arm. In either configuration, the rotation bracket rotates about 90 degrees.

The trunk conveyor system 20 includes a sensing system 104 positioned toward the front end 60. In the illustrated embodiment, the sensing system 104 comprises two light bar sensors 106 placed on directly across from each other on opposite sides of the first conveyor belt 64 although other sensors are within the scope of the present invention. The sensors 106 are positioned above the first conveyor belt 64 such that as a piece of lumber L is transported by the first conveyor belt, the sensors are able to tell when the piece of lumber is between them. In this manner, the sensors 106 can tell when the leading and trailing edges of the piece of lumber L have passed through the sensors. The sensors 106 then send a signal to the control system indicating the lumber L is on the first conveyor belt 64. As described in more detail below, the control system 200 then directs the lumber L to where it needs to go. The control system 200 is connected to the trunk conveyor system 20 and can tell the trunk conveyor system to operate the swing arm 66 to push the lumber L onto a receiving unit on either side of the first conveyor belt 64 or decide not to operate the swing arm and transport the lumber to the end of the first conveyor belt.

Thus, the trunk conveyor system 20 is able to transport the lumber L to three different locations, the first or second side of the first conveyor belt 64 or the rear end of the first conveyor belt. At each of these locations, a receiving unit can be placed to receive the lumber L from the trunk conveyor system 20. An arrangement where less than or greater than three receiving units are positioned adjacent to the trunk conveyor system 20 is also contemplated. In the preferred embodiment, at least one receiving unit is positioned next to the trunk conveyor system 20 to receive the lumber L therefrom. As discussed in more detail below, each receiving unit can be, but not limited to, another trunk conveyor system 20, another transition conveyor 18, a branch conveyor system 22, a stacker (not shown), a ramp assembly 28 and/or a waste collection system 32. These system components are exemplary only. Other components could be used as receiving units without departing from the scope of the present invention. The ability of the trunk conveyor system 20 to transport the lumber L to three different receiving units, especially to either side of the first conveyor belt 64, is important in some embodiments to the modularity of the lumber cutting and delivery system 10 as discussed in more detail below.

Figure 20:
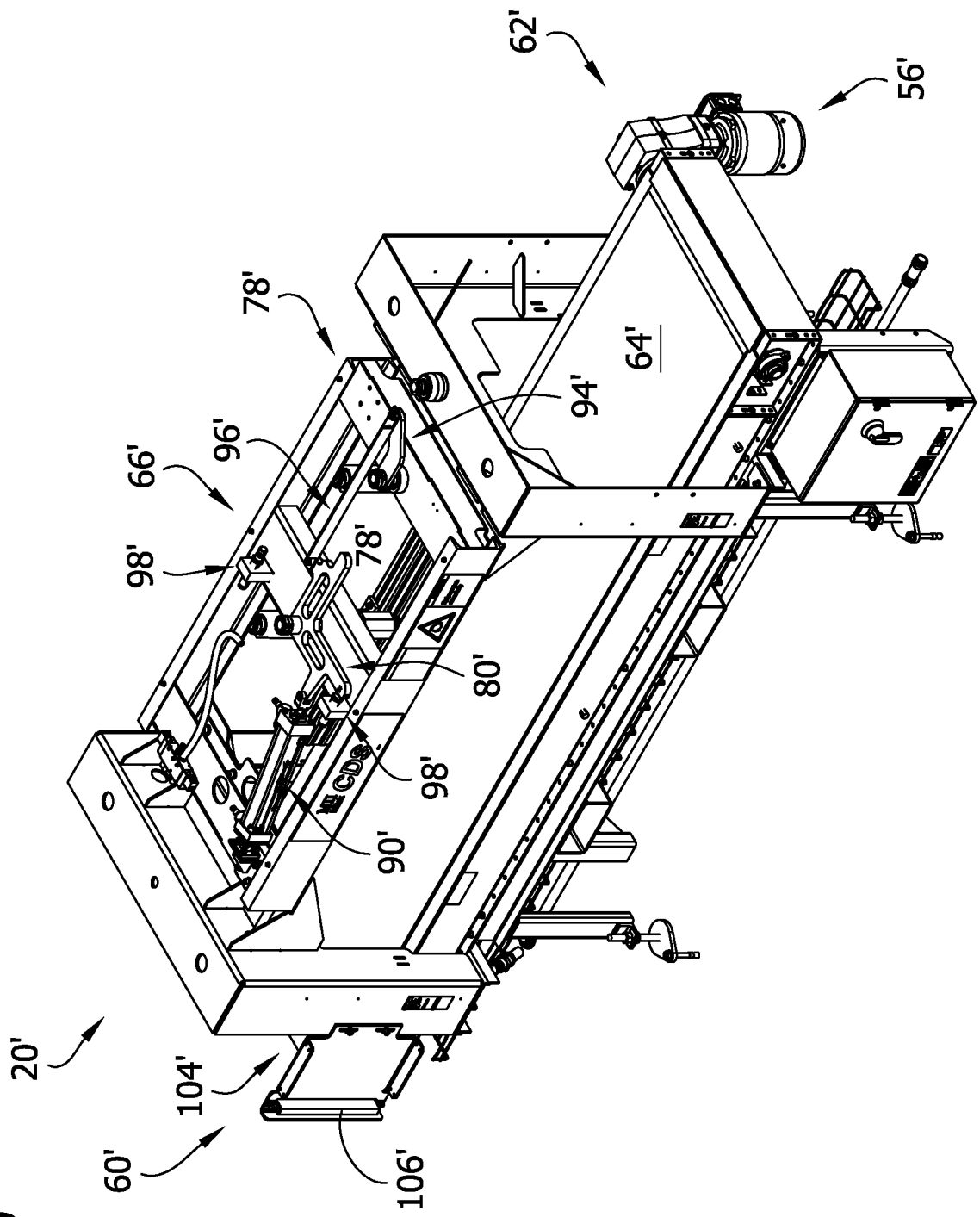
FIG. 20 is a perspective of another embodiment of a trunk conveyor system.
Figure 21:
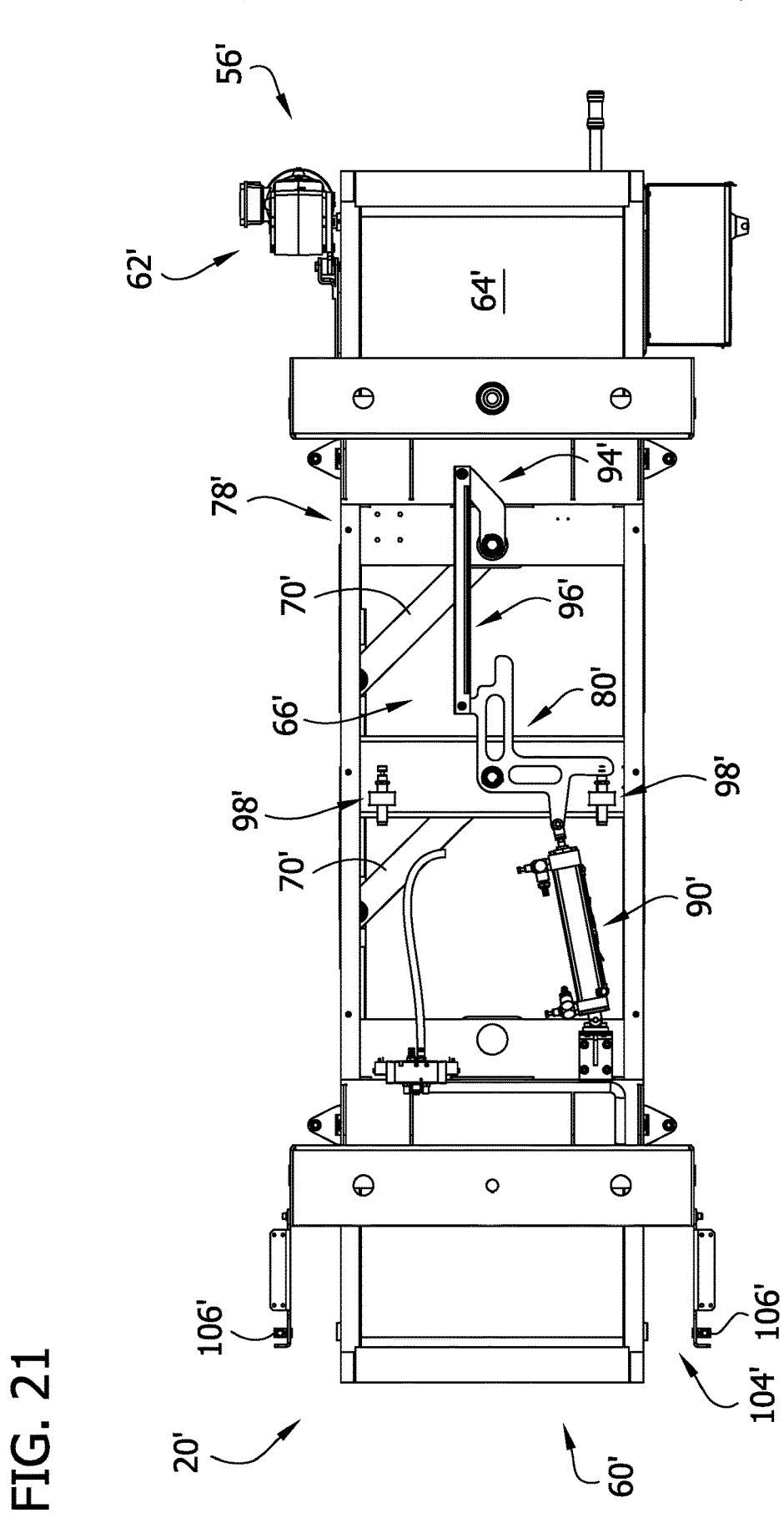
FIG. 21 is a top view thereof
Figure 22:
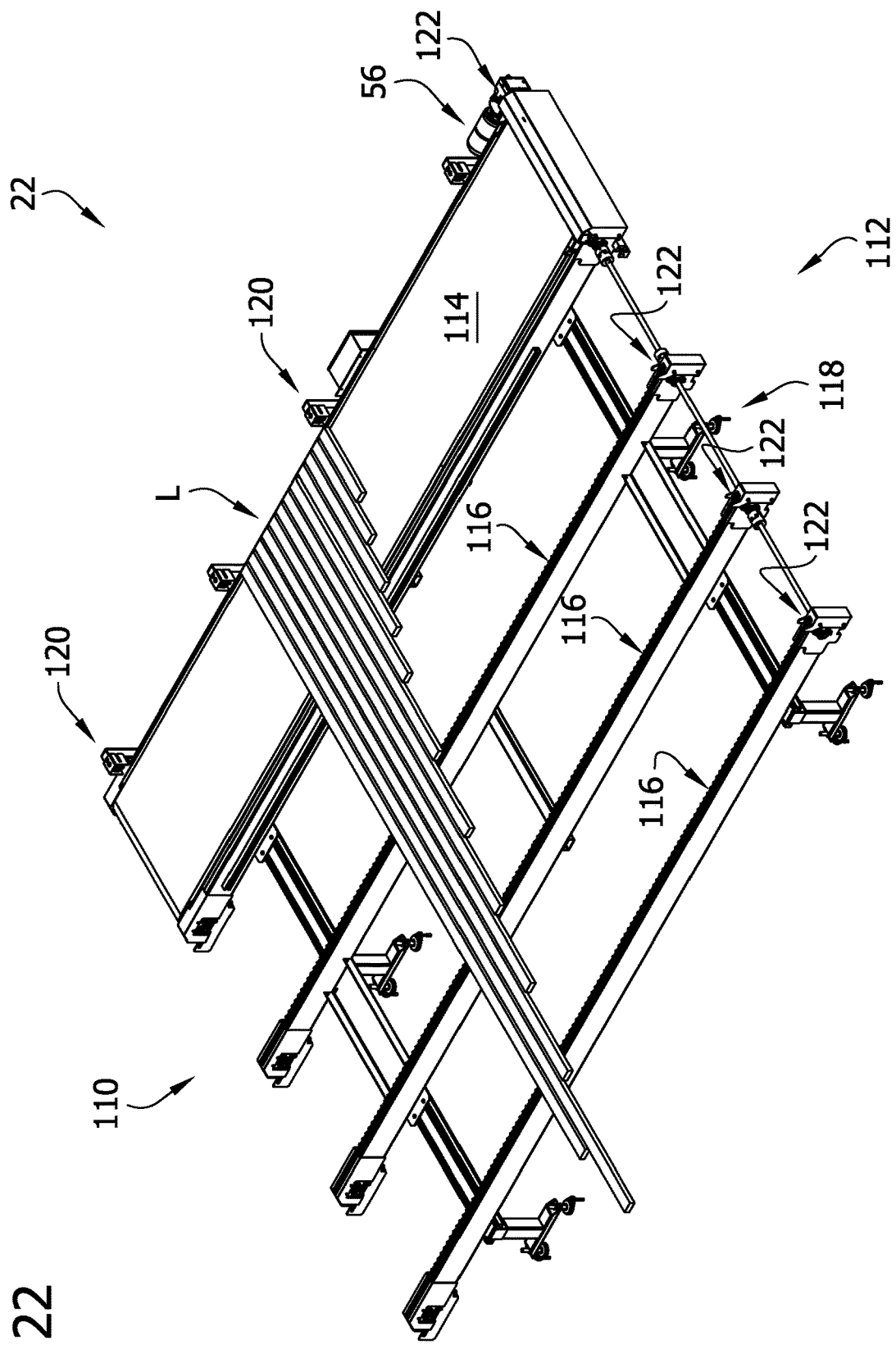
FIG. 22 is a rear perspective of a branch conveyor system.
Figure 23:
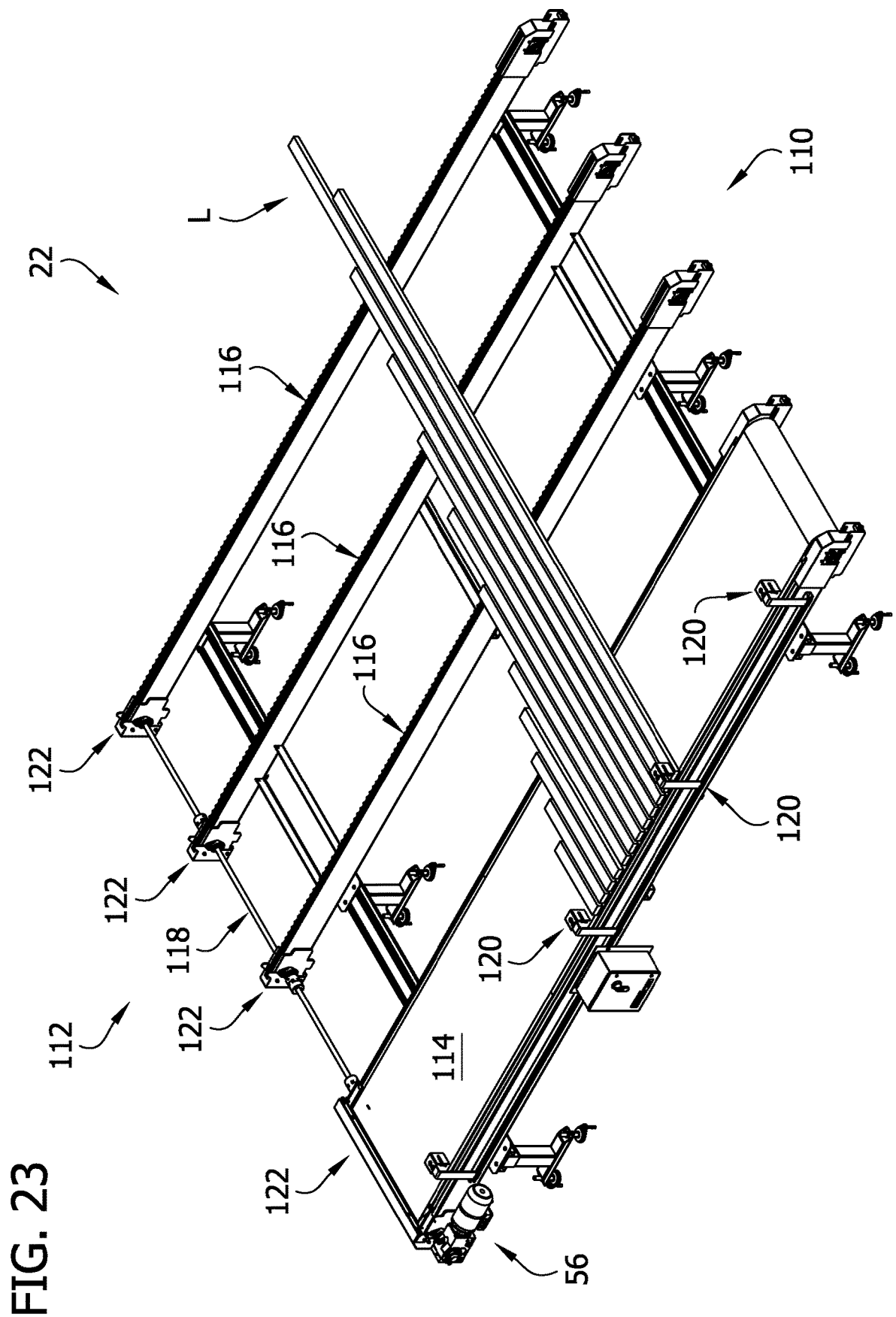
FIG. 23 is a front perspective thereof.
Figure 24:
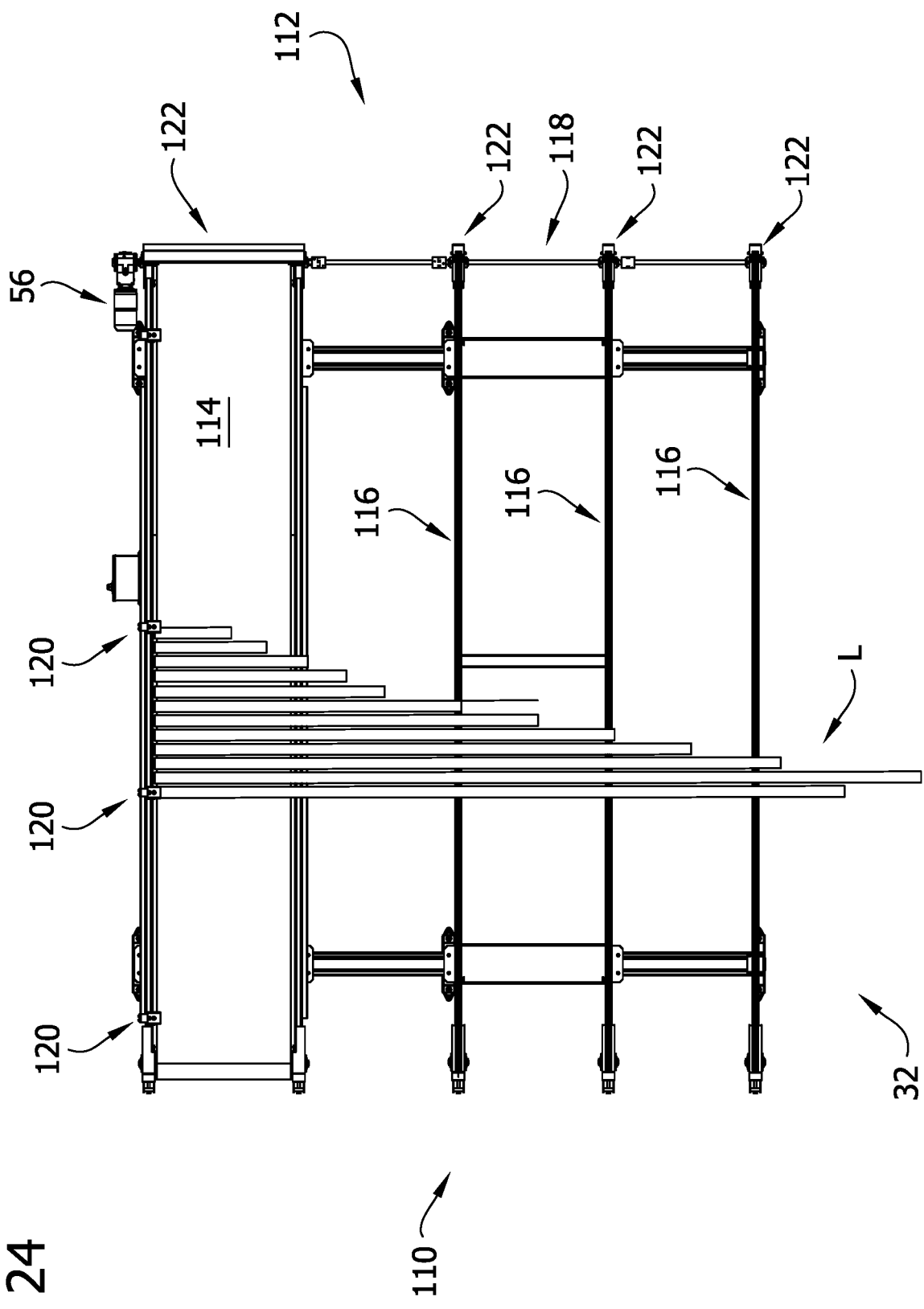
FIG. 24 is a top view thereof.

Referring to FIGS. 20 and 21, another embodiment of a trunk conveyor system is generally indicated at 20'. Trunk conveyor system 20' is analogous to trunk conveyor system 20 and, thus, corresponding parts have the same reference numeral with a trialing prime ('). Trunk conveyor system 20' is shorter than trunk conveyor system 20. Accordingly, trunk conveyor system 20' only has two shafts 76' connecting the push bar 68' of the ejector 66' to the frame 78'. Likewise, the trunk conveyor system 20' only includes a single shaft bar 96' extending between and connecting the rotation bracket 80' and the L-shaped bracket 94'. Trunk conveyor system 20' operates in the same way as trunk conveyor system 20.

Referring to FIGS. 1-4 and 22-24, the branch conveyor system 22 is one receiving unit which may be positioned to receive pieces of lumber L from the trunk conveyor system 20. The branch conveyor system 22 has a front end 110 positioned adjacent to one side of the first conveyor belt 64 and a back end 112 spaced apart from the front end with a main conveyor belt 114 (broadly, "main conveying element") spanning between the front and back ends. The branch conveyor system 22 receives the lumber L from the trunk conveyor system 20 when the ejector 66 of the trunk conveyor system pushes the lumber onto the main conveyor belt 114 at the front end 110 of the branch conveyor system. At least one guide (not shown) extends between the side of the trunk conveyor system 20 and the front end of the branch conveyor system 22 and supports the lumber L as the lumber slides onto the branch conveyor system. In one embodiment, there are a plurality of guides longitudinally spaced apart along the side of the trunk conveyor system 20, each guide being a piece of sheet metal with an upper edge extending downward from the side of the trunk conveyor system to the front end 110 of the branch conveyor system 22 (e.g., the front end of the branch conveyor system is positioned below the first conveyor belt). In one embodiment, one of the guides of the plurality of guides is an angled surface extending between the two components. The branch conveyor system 22 transports the lumber L in a direction that is generally transverse to the lumber's longitudinal axis and the trunk conveyor system 20.

The branch conveyor system 22 may also include additional secondary conveyors 116 spaced apart from each other and the main conveyor belt 114. The additional secondary conveyors 116 are parallel to the main conveyor belt 114 and span from the front to back end 110, 112 of the branch conveyor system 22. A drive train 118 operatively connects the secondary conveyors 116 together and to the main conveyor belt 114 to move the secondary conveyors and main conveyor belt together and at the same speed. The branch conveyor system 22 includes a motor 56 (e.g., electric motor) operative coupled to the drive train 118 and configured to drive movement of the main conveyor belt 114 and secondary conveying elements 116. The main conveyor belt 114 is wide enough to support smaller lengths of lumber L. Preferably the main conveyor belt 114 is at least 3 feet wide. The secondary conveying elements 116 are spaced apart from the main conveyor belt 114 and are used, along with the main conveyor belt 114, to support lumber L of longer lengths. Accordingly, the main conveyor belt 114 supports pieces of lumber L of shorter lengths and the main conveyor belt in combination with one or more the secondary conveying elements 116 supports pieces of lumber of longer lengths. In the illustrated embodiment, each secondary conveying element 116 comprises a continuous chain. In other embodiments, one or more of the secondary conveying elements 116 may be a wide conveyor belt like the main conveyor belt 114. The secondary conveyors 116 are positioned to lie in the same generally horizontal plane of the main conveyor belt 114.

The branch conveyor system 22 may also include at least one branch conveyor system sensor 120 positioned adjacent to and facing the main conveyor belt 114. The branch conveyor system sensor 120 is positioned above the main conveyor belt 114 and able to sense when a piece of lumber L is in front of it. Thus, similar to the sensors 106 of the trunk conveyor system 20, the branch conveyor system sensors 120 can tell when a leading and trailing edge of the piece of lumber L has passed through the sensors. The branch conveyor system sensors 120 then send a signal to the control system indicating a piece of lumber L is in front of the sensor and on the main conveyor belt 114. The control system can then tell the branch conveyor system 22 to continue operating the main conveyor belt 114 and secondary conveying elements 116 or stop them. In the preferred embodiment, four branch conveyor system sensors 120 are positioned along the main conveyor belt 114. Two sensors 120 are placed at each end of the main conveyor belt 114 with the other two sensors placed in-between. The location of each sensor 120 along the main conveyor belt 114 is recorded in the control system 200 such that as the lumber L passes by each sensor, the sensor sends a signal to the control system 200 and the control system 200 knows where the lumber is positioned along the branch conveyor system 22.

The branch conveyor system 22 also includes at least one end stop 122 located at the back end 112 of the branch conveyor system. The end stop 122 prevents the lumber L from falling off the branch conveyor system 22 when the lumber reaches the end of the main conveyor belt 114 and secondary conveyors 116. In the preferred embodiment, an end stop 122 is located at the end of the main conveyor belt 114 and each secondary conveying element 116. As the lumber L contacts the end stop 122, the movement of the lumber is stopped while the main and secondary conveyor belts 114, 116 are allowed to continue to move, sliding underneath the lumber. In this manner, the branch conveyor system 22 is able to continue to transport additional pieces of lumber L received from the trunk conveyor system 20 to the back end 112 of the branch conveyor system. As multiple pieces of lumber L are transported by the branch conveyor system 22, they will gather and form a backup at the back end 112 of branch conveyor system if they are not removed. In this case, the branch conveyor system sensors 120 can sense this backup and tell the control system 200 how full the branch conveyor system 22 is. When the backup reaches the sensor 122 located near the front end 110 of the branch conveyor system 22, a signal can be sent by that sensor to the control system 200, indicating to the control system not to direct any more pieces of lumber L to the branch conveyor system 22. A backup is detected by a branch conveyor system sensor 122 when the sensor continues to sense the lumber L in front the sensor even though the main conveyor belt 114 continues to move. The lumber L continues to be sensed by the sensor 122 because the lumber does not move past the sensor.

The branch conveyor system 22 is particularly configured to hold truss members of different lengths and sizes without the truss members racking and falling off the branch conveyor system. Shorter length truss members will be entirely supported by the main conveyor belt 114, which is relatively wide so that the main conveyor belt can support the entire length of shorter truss members. However, longer truss members are supported by the main conveyor belt 114 and secondary conveying elements 116. The belt of the main conveyor belt 114 is constructed to provide a force to drive the truss members to the end stop 122. Once the leading truss member hits the end stop 122, its forward movement is halted and the main conveyor belt 114 slides underneath it. The second truss member hits the leading truss member and also stops with the main conveyor belt 114 sliding underneath it, and so on. The secondary conveying elements 116 are preferably formed by outboard roller chains. These chains carry rollers that engage and provide driving force to advance the longer truss members toward the end stop 122. However, when the longer truss members engage an obstruction (e.g., by engaging the truss member in front of it or the stop 122), the rollers will roll and pass under the longer truss members so that they impart no more than a negligible force on the longer truss members. As a result, the secondary conveying elements 116 do not cause the longer truss members to become skewed (or to "rack") when truss members back up on the branch conveyor system 22.

Figure 25:
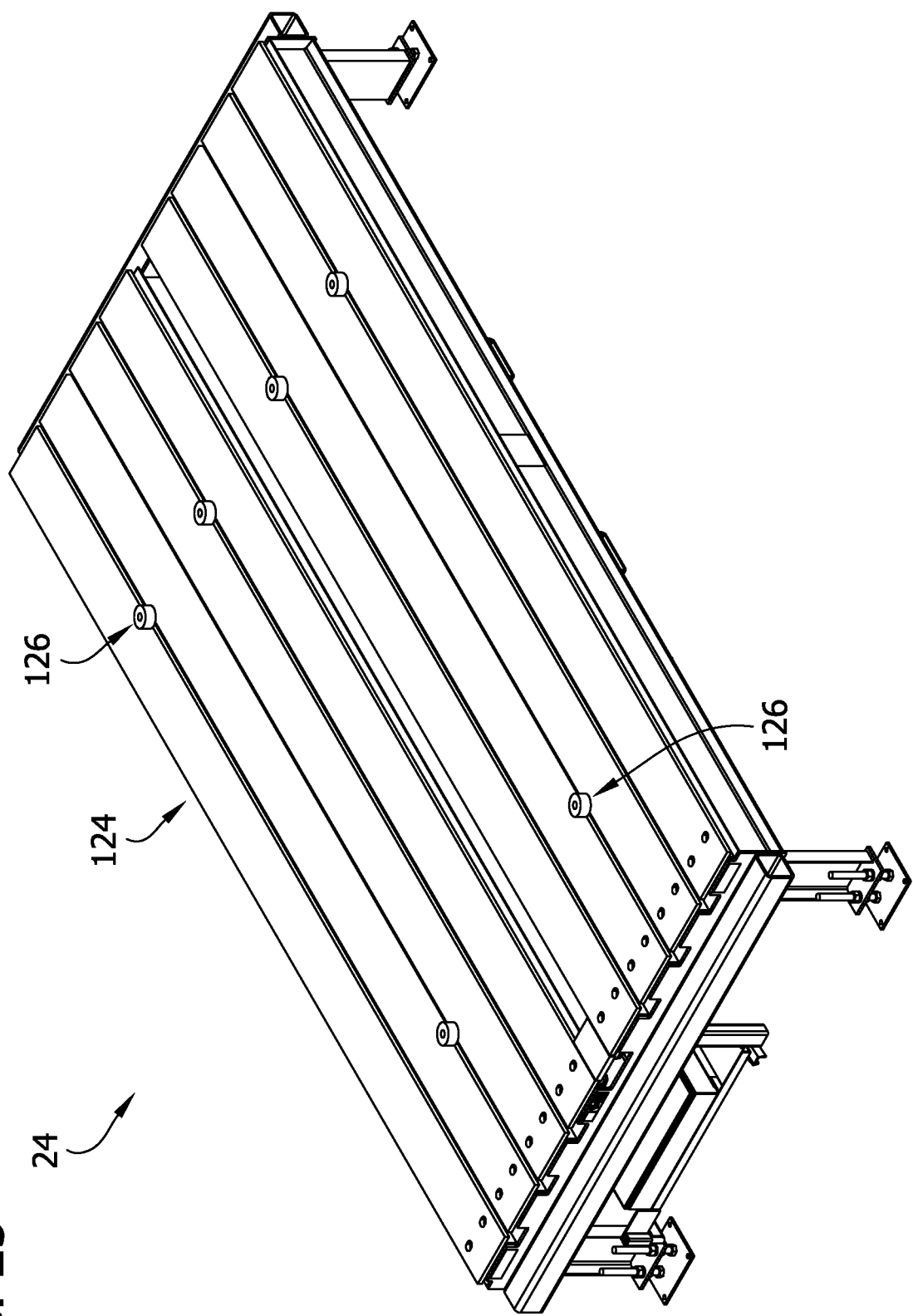
FIG. 25 is a perspective of a section of a truss table.

Referring to FIGS. 1-4 and 25, a truss table 24 is positioned adjacent to the back end 112 of the branch conveyor system 22. The truss table 24 generally includes a large, flat support surface with a jigging system allowing an operator to quickly position the lumber L to form a truss. Each truss table 24 is made up of a plurality of truss table sections 124 (FIG. 25). The number of truss table sections 124 in each truss table 24 can vary depending upon the desired length of the truss table (e.g., the more truss table sections, the longer the truss table). Further details of truss tables may be found in U.S. Pat. Nos. 6,702,269 and 6,807,903, incorporated herein by reference. The operator grabs the lumber L delivered to the back end 112 of the branch conveyor system 22 and arranges the lumber on the truss table 24 to form the truss. Because the pieces of lumber L are delivered next to the truss table 24, the operator is able to quickly grab the pieces of lumber L from the branch conveyor system 22 and position them on the truss table. This significantly reduces the time and energy the operator must spend in transporting the pieces of lumber L to the truss table 24. Alternatively, one or more robotic cells 30, as discussed below, may be configured to pick up the pieces of lumber L from the branch conveyor system 22 and arrange the pieces on the truss table 24. In a preferred embodiment, the truss table 24 may have its own truss table software that interacts with the control system 200. For example, the truss table 24 may be informed of the particular truss to be assembled on it and automatically position locating stops 126 on the table in proper position. However, even before action is taken on the truss table 24, truss table software may determine the ideal orientation of the truss to be assembled on the truss table, taking into account the size of the truss, the location of completed truss ejectors on the table, etc. Once the optimized orientation is determined, this may be shown on a viewing screen near the truss table 24 to assist the assemblers (e.g., operators) in placement of the truss members. In some embodiments, the truss members carry printed information about where they are to be placed in on the truss table 24 to form the truss, and where nailing plates to interconnect the truss members are to be located. It is also possible to use an overhead laser projection system to put the image of the truss on the truss table 24, as directed by the truss table software, and provide information where truss members and nailing plates are to be located.

Referring to FIGS. 1-3 and 27, another receiving unit that can be positioned adjacent to and receive lumber L from the trunk conveyor system 20 is a waste collection system 32. In the illustrated embodiment, the waste collection system 32 is a bin or container positioned to collect the pieces of lumber L as they fall off the trunk conveyor system 20. The bin can be placed adjacent to the rear end 62 of the trunk conveyor system 20 and receive the pieces of lumber L as they fall off the end of the first conveyor belt 64. The bin can also be placed adjacent the first or second side of the first conveyor belt 64 and receive the pieces of lumber L as they are pushed by the swing arm. In the preferred embodiment, the lumber L the bin collects is the waste from the cutting system 16. However, configurations where the bin collects remainders or truss members is also contemplated.

Referring to FIGS. 1-4 and 26, another receiving unit that can be positioned adjacent to and receive lumber L from the trunk conveyor system 20 is a ramp assembly 28. The ramp assembly 28 includes a main ramp 128 with an angled surface 130 with a top edge 132 and a bottom edge 134. The top edge is placed next to the first conveyor belt 64. The angled surface 130 can be a flat piece of material or it can be formed from a plurality of rollers, as illustrated, in a parallel configuration with each other and the top and bottom edges 132, 134 of the angled surface. A configuration where the plurality of rollers are parallel with each other but not with the top and bottom edges 132, 134 of the angled surface 130 is also contemplated. A rest 136 is located near or at the bottom edge 134 and extends above the angled surface 130 to prevent the pieces of lumber L from sliding off the main ramp 128. In the preferred embodiment, the ramp assembly 28 is positioned next to the first or second side of the first conveyor belt 64. In this arrangement, the top edge 132 of the main ramp 128 is adjacent to and generally parallel with the first or second side of the first conveyor belt 64. The swing arm 66 can then push the lumber L from the first conveyor belt 64 onto the ramp assembly 28. Once the lumber L is on the ramp assembly 28, the lumber slides down the angled surface 130 and stops against the rest 136 or other pieces of lumber already on the main ramp 128 of the ramp assembly 28.

Figure 26:
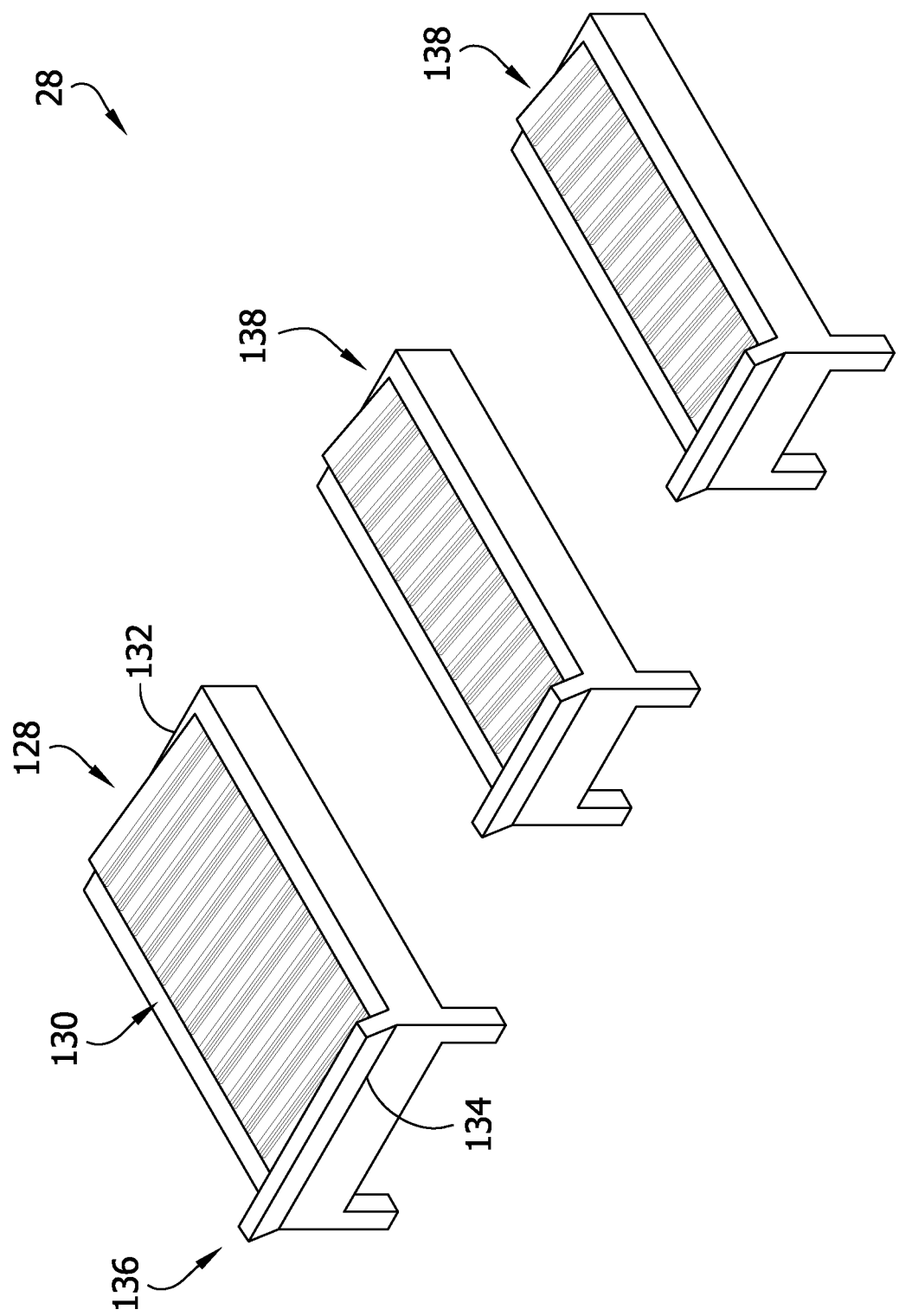
FIG. 26 is a perspective of a ramp assembly.

As shown in FIG. 26, the ramp assembly 28 may include the main ramp 128 and one or more secondary ramps 138. The secondary ramps 138 are generally the same as the main ramp 130 except that the secondary ramps have a smaller width. In other embodiments, the secondary ramps may have the same width as the main ramp 128. The main and secondary ramps 128, 138 are generally parallel with each other, with the top edge 132 of each ramp positioned by one of the sides of the first conveyor belt 64. The inclusion of the secondary ramps 138 allows the ramp assembly 28 to support longer pieces of lumber L than could be supported by just the main ramp 128.

Referring to FIGS. 1-3 and 28, the lumber cutting and delivery system 10 may include one or more robotic cells 30 positioned next to one or more of the components of the lumber cutting and delivery system. For example, as shown in FIGS. 1-3, a robotic cell 30 can be positioned by the ramp assembly 28. The robotic cell 30 may also be positioned next to the back end 112 of the branch conveyor system 22. The robotic cell includes a rotating base 140, a first arm 142 connected to the base, a second arm 144 connected to the first arm and a head 146. The base 140, first arm 142, second arm 144 and head 146 are all movable relative to one another. In one embodiment, the base 140 of the robotic cell 30 is movably mounted on a track (not shown), such as a set of rails, to permit the robotic cell to move between two or more locations along the track. The head 146 can pick up a piece of lumber L using suction or other gripping methods known in the art. The robotic cell 30 is configured to pick up a piece of lumber L from one location, such as a receiving unit, and move the piece of lumber to another location. For example, a robotic cell 30 can move one or more pieces of lumber L from a ramp assembly 28 to an automated guide cart (not shown), a manual cart (not shown), or pallet (not shown). It is understood the robotic cell 30 can be used with other components of the lumber cutting and delivery system 10 as well. For example, a robotic cell 30 may be used to load a bunk 46 with lumber L. In one embodiment, one or more robotic cells 30 can be positioned adjacent to the back end 112 of the branch conveyor system 22 so that the robotic cell can pick up the pieces of lumber L from the branch conveyor system and arrange the pieces on the truss table 24 to assemble the wooden truss. It is understood that the robotic cell 30 may be used to move pieces of lumber L between other components of the lumber cutting and delivery system 10 than described herein. Each robotic cell 30 can be in communication with and/or operated by the control system 200.

The lumber cutting and delivery system 10 may also include one or more automated guide carts (not shown). The automated guide carts are configured to transport one or more pieces of lumber L to different components of the lumber cutting and delivery system 10. The automated guide cart may include a storage area where pieces of lumber L can be stacked. Once the storage area of the automated guide cart is loaded with pieces of lumber L, the automated guide cart can move the pieces of lumber to another location. For example, after the robotic cell 30 has loaded the automated guide cart with lumber L, the automated guide cart can transport the lumber to a truss table 24, back to the loading system 12, to a lumber disposal area or to a component that is not part of the lumber cutting and delivery system 10 such as a standalone truss table. Alternatively, the automated guide carts may not include a storage area but instead pull a separate cart that is configured to hold the pieces of lumber L. Automated guide carts are generally known in the art and, thus, a detailed description is omitted here. Generally, each automated guide cart includes a driver configured to move the cart and a controller configured to operate the driver to move the automated guide cart to the various designated locations. The automated guide cart may also include scanners and/or sensors configured to sense the surrounding area and/or the payload (e.g., lumber L) being carried by the cart. Each automated guide cart is in communication with (e.g., wireless communication) and/or operated by the control system 200.

Another receiving unit that can be positioned adjacent to and receive lumber L from the trunk conveyor system 20 is the stacker (not shown). The stacker can be positioned between the trunk conveyor system 20 and the branch conveyor system 22. The stacker receives the lumber L from the trunk conveyor system 20 in a similar manner to how the branch conveyor system 22 receives the lumber from the trunk conveyor system. The swing arm 66 of the trunk conveyor system 20 pushes the lumber L onto the stacker. The stacker then moves the piece of lumber L into a stacked configuration with other pieces of lumber. The stacker is connected to and controlled by the control system 200. Upon receiving a signal from the control system 200, the stacker moves the lumber L from the stacked configuration onto the branch conveyor system 22. Using the stacker allows the lumber L to be moved off the trunk conveyor system 20 and stored in the stacker until the lumber is ready to be delivered to the truss table 24 by the branch conveyor system 22. The stacker can also be used without the branch conveyor system 22, collecting and storing the lumber L received from the trunk conveyor system 20 until an operator unloads the lumber.

Additional trunk conveyor systems 20 and transition conveyors 18, as described above, can also be receiving units, as described below.

Having described the different components of the lumber cutting and delivery system 10 of the present invention, namely the loading system 12, the infeed conveyor 14, the cutting system 16 (e.g., saw), the transition conveyor 18, the trunk conveyor system 20, the branch conveyor system 22, the truss table 24, the stacker, the ramp assembly 28, the robotic cell 30, the culling station and the automated guide cart, the modular nature of the system will now be described. The modularity of the system allows the lumber cutting and delivery system 10 to be arranged in numerous different configurations to meet the truss building needs of different operators.

Each component of the lumber cutting and delivery system 10 can be arranged in different combinations with the other components. Generally speaking, the lumber cutting and delivery system 10 will typically have the loading system 12, the infeed conveyor 14 and cutting system 16 at the beginning (e.g., beginning of a line) to select and cut the lumber L to the required shape and length. For example, the control system 200 may receive information from truss design software, and thus, knows the various truss members needed for each truss, as well as the total number of trusses to be made in a particular work period. From there any number of trunk conveyor systems 20 and/or transition conveyors 18 can be arranged to transport the processed lumber L from the cutting system 16 to any number of different receiving units. Moreover, as shown in FIG. 4, in one embodiment, the lumber cutting and delivery system 10' can include multiple lines 11 (e.g., assembly lines), by having multiple loading systems 12, infeed conveyors 14 and cutting systems 16 along with the corresponding conveyor systems and truss tables 24 to increase the overall production capacity of the system. Lumber cutting and delivery system 10' is the generally the same as lumber cutting and delivery system 10 except that lumber cutting and delivery system 10' includes four lines 11 (e.g., assembly lines) whereas lumber cutting and delivery system 10 only has one line.

The lumber cutting and delivery system 10 can be arranged to deliver cut truss members to one or more (e.g., two, three, four, etc.) truss tables 24. For example, in the embodiment illustrated in FIGS. 1-3, the lumber cutting and delivery system 10 transforms a standard piece of dimensioned lumber L into a truss member and delivers that truss member to a single truss table 24. However, if a second truss table 24 is desired in order to build two trusses at once, the system 10 can be arranged to support two truss tables 24 (see FIG. 4). An additional branch conveyor system 22 can be added so that the trunk conveyor system 20 has one branch conveyor system on the first side of the first conveyor belt 64 that delivers lumber L to a first truss table 24 and another branch conveyor system on the second side of the first conveyor belt that delivers lumber to a second truss table. After the trunk conveyor system 20 receives the pieces of lumber L from the cutting system 16, the ejector 66 directs the piece of lumber to the correct branch conveyor system 22 so that the piece of lumber is delivered to the truss table 24 requiring that particular piece of lumber. This direction or sorting system will be discussed in more detail below. The waste collection system 32 can be added to the rear end 62 of the trunk conveyor system 20 to collect any pieces of lumber L not directed to one of the branch conveyor systems 22 (see FIGS. 1-3).

Additional trunk conveyor systems 20 can also be arranged in the lumber cutting and delivery system 10 (see FIGS. 1-4). The front end 60 of each additional trunk conveyor system 20 can be positioned adjacent to and in line with the rear end 62 of the previous trunk conveyor system. In this manner, the trunk conveyor systems 20 are positioned in end to end relation with respect to one another such that the lumber L travels from one trunk conveyor system to the next trunk conveyor system. Likewise, if a greater distance is required between trunk conveyor systems 20, additional transition conveyors 18 can be placed in between trunk conveyor systems in a similar end to end manner to transport the lumber L the desired distance (see FIGS. 1-4). Thus, it is apparent that for each additional trunk conveyor system 20 added to the lumber cutting and delivery system 10, additional pathways or options are available to direct the lumber L to more locations and other lumber receiving units.

For example, if construction of a large truss requiring one large truss table 24 as shown in FIGS. 1-3 (or two truss tables) is desired, the lumber cutting and delivery system 10 having two trunk conveyor systems 20 can be used. Each trunk conveyor system 20 has a branch conveyor system 22 positioned adjacent to the first side of a corresponding one of the first conveyor belts 64 to deliver the lumber L to the truss table 24. For example, the truss members for one end of the large truss can be directed to the first in line branch conveyor system 22 and the truss members for the other end of the large truss can be directed to the second in line branch conveyor system. If the distance between the two truss tables 24 is great enough, a transition conveyor 18 may be placed between the two trunk conveyor systems 20 (see FIGS. 1-4). As the first in line trunk conveyor system 20 receives the lumber L from the cutting system 16, the ejector 66 can push the lumber required for the part of the truss being constructed on one end of the truss table 24 onto the corresponding branch conveyor system 22 while allowing the other pieces of lumber required to construct the part of the truss being construction on the opposite end of the truss table to be transported to the second in line trunk conveyor system. Alternatively, a ramp assembly 28 or other receiving unit described herein can be positioned on the second side of the first conveyor belt 64 of the first in line trunk conveyor system 20. The ejector 66 of the first in line trunk conveyor system 20 can then direct the lumber L, such as remainders, onto the ramp assembly 28 or other receiving unit. As the second in line trunk conveyor system 20 receives the lumber L from the first in line trunk conveyor system, the ejector 66 can push the lumber required to construct the part of the truss being constructed on the opposite end of the truss table 24 onto the branch conveyor system 22. In this manner, the lumber cutting and delivery system 10 can deliver truss members to the section of the truss table 24 (in this case the either end) the truss member will be positioned on to form the truss. In this example, a waste collect system 32 can be located at the rear end 62 of the second in line trunk conveyor system 20 to receive any lumber L not moved off the conveyor line by an ejector 66. Additionally, another receiving unit can be positioned along the second side of the second in line trunk conveyor system 20. This receiving unit can be another branch conveyor system 22 to transport pieces of lumber L to another truss table.

Thus, it is apparent that by adding additional trunk conveyor systems 20 a multitude of arrangements fitting the needs of the truss production facility can be created. The ability of each trunk conveyor system 20 to transport the lumber L to three different receiving units allows the system to be expanded or altered as desired. The modularity to select from a variety of receiving units grants the flexibility to create a lumber cutting and delivery system 10 customized to fit the truss building needs. Moreover, the ability to add additional lines 11 (e.g., assembly lines) to the lumber cutting and delivery system 10 allows an increase in the overall production capacity of the system.

Having described the different components of the lumber cutting and delivery system 10, the control system 200 will now be described. The control system 200 controls/operates/directs every controllable component of the lumber cutting and delivery system 10 (e.g., cutting system, not passive components like the waste collection system or ramp assembly). Specifically, the control system 200 controls the operation of the loading system 12, infeed conveyor 14, cutting system 16, any transition conveyors 18, any trunk conveyor systems 20, any branch conveyor systems 22, culling station, any stackers, any automated guide carts, and any robotic cells. Broadly, the control system 200 includes all the software (e.g., programming) configured to operate the lumber cutting and delivery system 10 and any controllers or computers (e.g., hardware) configured to execute the software on the various components of the lumber cutting and delivery system.

Figure 30:
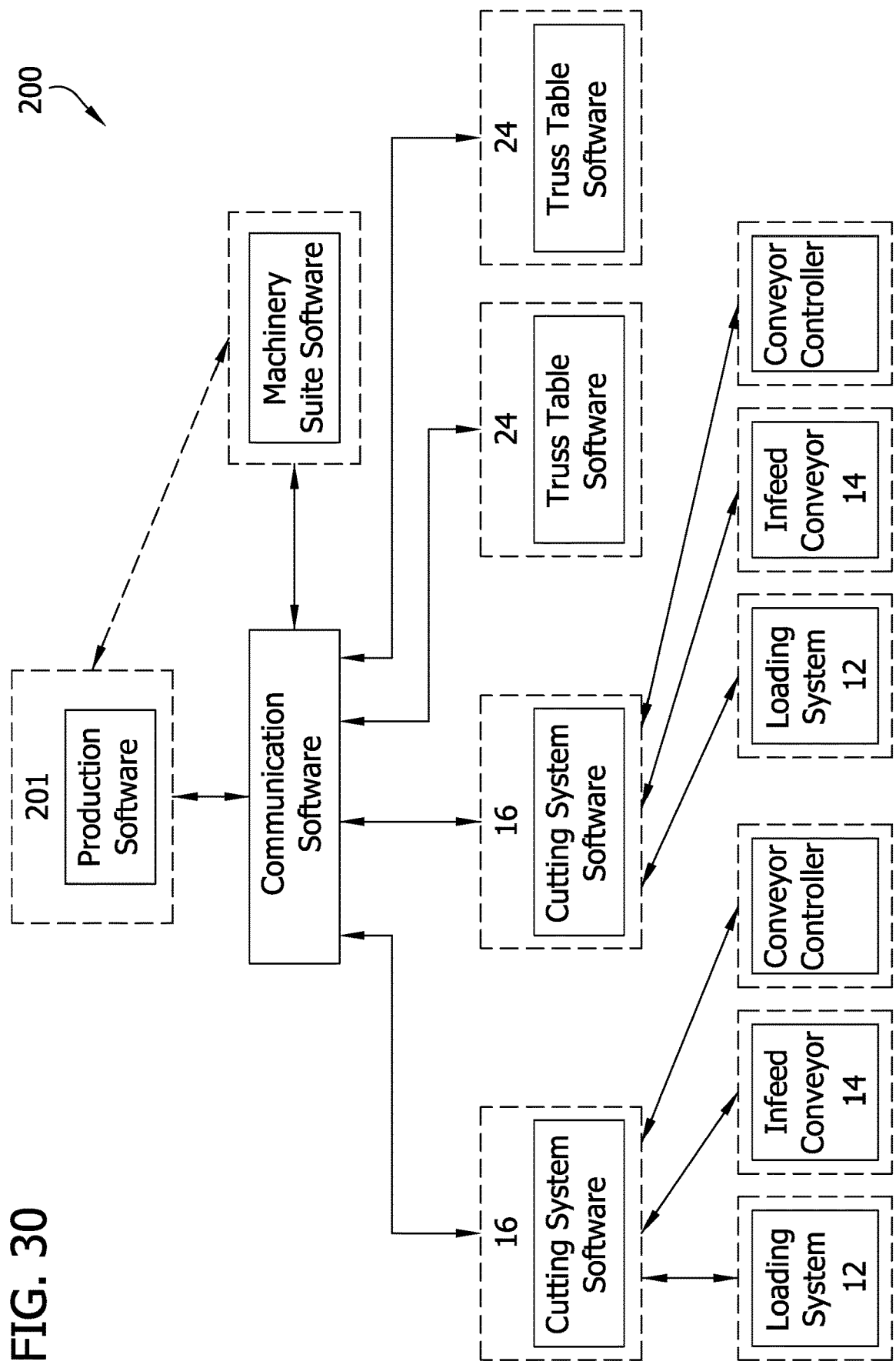
FIG. 30 is a schematic illustration of a control system.

Referring to FIG. 30, an exemplary schematic illustration of the control system 200 is shown. The control system 200 includes a central control station 201 that has a display, a user interface and a computer connected to the user interface and the display (e.g., a desktop computer). The computer contains production software that is configured (e.g., programmed) to operate the lumber cutting and delivery system 10. One example of a suitable production software is MiTek Virtual Plant (MVP), although other production software is within the scope of the present invention. A production manager may access and interface with the production software via the display and user interface to set and control (e.g., manage) the operation of the lumber cutting and delivery system 10. The central control station 201 can be located remote of the lumber cutting and delivery system 10 or next to a component of the lumber cutting and delivery system 10, such as the cutting system 16. For example, in one embodiment, the central control station 201 is located in an office adjacent the production floor containing the lumber cutting and delivery system 10. The central control station 201 is in wireless and/or wired communication with other components of the control system 200.

To operate the lumber cutting and delivery system 10, the production manager may, in one embodiment, import one or more truss design files containing data related to one or more truss designs into the production software via the central control station 201. The truss design files are created by truss design software. The production software is programmed (broadly, configured) to allow the production manager to decide, for example, which truss designs are to be constructed by the lumber cutting and delivery system 10 and how many truss designs are to be constructed. The production software also includes data (e.g., size, physical relationship to other components, etc.) about all the truss tables 24 in the lumber cutting and delivery system 10 and is configured to select the appropriate truss table on which to assemble and arrange the truss members to construct the wooden truss or other wooden construct. In one embodiment, the production software is programmed to allow the production manager to select the truss table 24 on which to construct the wooden truss. The production software may also be programmed to show, via the display, a virtual layout of the lumber cutting and delivery system 10 and show information relating to the operation of the system to the production manager. Accordingly, the production software is programmed to receive data (e.g., performance data, history data, etc.) from the other components of the control system 200. This data can then be used by the production software to show the information relating to the operation of the lumber cutting and delivery system 10 and/or generate history and/or performance reports about the operation of the system.

The control system 200 includes communication software in communication with the production software and configured to receive information from the production software and distribute that information to other components of the lumber cutting and delivery system 10. The communication software can be run on the central control station 201 or a separate device (e.g., computer, server) in communication with the central control station. In one embodiment, the communication software is integral (e.g., a part of) the production software and is not a separate software program. Upon receiving an appropriate input signal (e.g., start, begin) via the user interface of the central control station 201 from the production manager, the production software reads the truss design files and generates and sends one or more sets of job instructions (e.g., data) to the communication software based on the truss design files. Each set of job instructions corresponds to one truss design and contains all the necessary data (e.g., instructions, parameters, inputs) in order to operate the components of the lumber cutting and delivery system 10 to produce the truss design. Accordingly, each set of job instructions includes, but is not limited to, data about the various truss members that make up wooden truss (e.g., sizes, lengths, dimensions, cut angles, etc.), printing data for the printer to mark the truss members, arrangement data relating to the specific arrangement of the various truss members in the wooden truss, truss table identification data identifying the truss table 24 the wooden truss is to be assembled on and, therefore, where the truss members need to be transported to, etc. The communication software is configured to then send at least a portion of the job instructions to the various appropriate components of the lumber cutting and delivery system 10 so the instructions can be executed. The communication software may also generate and send new instructions to the various components based on the received job instructions.

In one embodiment, the communication software may include a scheduling software module configured to schedule the order the job instructions are sent out and, thus, the construction order of the wooden trusses, and more specifically the truss members, by the lumber cutting and delivery system 10. The scheduling software module may schedule the jobs in a first-in/first-out manner or a priority-based manner based on information put into the production software (e.g., the production manager indicates certain wooden trusses are to be constructed before others). Other ways of scheduling the jobs are within the scope of the present invention.

The communication software may also include an optimization software module configured to optimize the creation of the wooden trusses or constructs. The optimization software module is configured to analyze each set of job instructions and optimize a parameter which can be chosen by the production manager via the production software. For example, and without limitation, the parameter may be to minimize waste generated by the cutting system 16, or minimize the cost of operating the cutting system, or minimize the number of cuts performed by the cutting system. The optimization software module schedules the cutting of lumber L by the cutting system 16 to optimize the chosen parameter. For example, to minimize waste, the optimization software module schedules the cutting of lumber L to maximize the number of truss members cut from each piece of lumber (e.g., maximize the amount of each piece of lumber used to create truss members). This may include cutting multiple truss members from a single piece of lumber L or cutting the piece of lumber to create a remainder, not waste. To minimize the number of cuts performed by the cutting system 16, the software module schedules the cutting of lumber L so that truss members which share a corresponding cut angle are cut from the same piece of lumber L, thereby allowing the cutting system 16 to make one cut for two truss members. The optimization software module can optimize the parameter on an individual truss basis (e.g., while cutting the truss members for a single truss) or on a multi-truss basis (e.g., while cutting the truss members for multiple trusses). The optimization software module may also optimize the positioning of the truss members on the truss table 24 (e.g., arrangement and orientation of the wooden truss on the truss table) so that the maximum number of connector plates are supported by the truss table (e.g., minimize the number of connector plates positioned over the slots in the truss table the stops move in). Optimizing the position of the truss members on the truss table 24 may also be done by the truss table software, as described herein.

The communication software is in communication with at least some of the local controllers or computers that control the individual components of the lumber cutting and delivery system 10. For example, in the embodiment of the control system shown in FIG. 30, the communication software is in communication with the local controller and computers for two cutting systems 16 and two truss tables 24. The communication software can be in communication with more or fewer cutting systems 16 and/or truss tables 24. The communication software may also be in communication with other components of the lumber cutting and delivery system 10. Accordingly, the production software is able to operate the lumber cutting and delivery system 10 regardless of the number of cutting systems 16 and truss tables 24. For example, the production software can operate the lumber cutting and delivery system 10 shown in FIG. 4, which has four lines 11, each line having a cutting system 16 and at least one truss table 24 associated with each cutting system.

Each truss table 24 includes a local controller or computer in communication with the communication software. The communication software is configured (e.g., programmed) to send data relating to or contained in the job instructions to truss table software on the local controller or computer. The data sent by the communication software includes, but is not limited to, data relating to the configuration of the wooden truss, the arrangement of the various different truss members that make up the wooden truss, connector plate locations, etc. The truss table software is configured to analyze this data sent by the communication software and move the corresponding stops to the correct positions. In addition, the truss table software may be configured to show a layout of the truss on a monitor and/or project a layout of the truss on the truss table 24 via a projector to help facilitate the positioning of the truss members on the truss table by the operator. In one embodiment, it is the truss table software that determines the optimal way to orient the truss on the truss table 24 to maximize the number of connector plates supported by the truss table. The truss table software is also configured to send performance and history data to the communication software. This data can include information indicating the construction of the wooden truss on the truss table 24 is done. For example, the operator can press a button to indicate the construction of the truss is complete and this data is then sent to the communication software to let the control system 200 (e.g., production software, cutting system 16, etc.) know the truss table 24 is available to assemble another truss.

As mentioned above, each cutting system 16 includes a human machine interface 17 (FIG. 9). The human machine interface 17 includes a local computer in communication with the communication software and, preferably, a user interface 204 and a display 202 connected to the computer. In some embodiments and not just limited to the cutting system, the user interface and display may be combined (e.g., a touch screen display). The communication software is configured send data relating to or contained in the job instructions to cutting system software on the local computer of the human machine interface 17. The data sent by the communication software includes, but is not limited to, data relating to the order truss members are to be cut, the dimensions of the truss members to be cut, the truss table 24 the truss members need to be sent to, printer information, etc. The cutting system software may include a machinery database that receives and stores the data (e.g., instructions) outputted from the production software, via the communication software. In addition, performance and history data received by the cutting system software from other components of the lumber cutting and delivery system 10 may be stored in the machinery database before being sent to the production software, via the communication software. The production manager may also be able to access the machinery database using the user interface of the human machine interface 17. The cutting system software is configured to analyze the job instructions sent by the communication software and create the truss members in response. Specifically, the cutting system software is configured to analyze the data sent by the communication system and then send instructions to the local controllers or computers for the loading system 12 and infeed conveyor 14 so that the loading system selects and the infeed conveyor delivers the appropriate piece of lumber L to the cutting system 16 to form the required truss member(s). Accordingly, the cutting system software is in communication with the infeed conveyor 14 and loading system 12. The instructions sent by the cutting system software to the loading system 12 includes information relating to the type (e.g., thickness, width, length) of lumber L the loading system is to select. The local controller or computer for the loading system 12 then operates the various components of the loading system so that the loading system grabs the appropriate piece of lumber L from the storage area and loads the lumber onto the infeed conveyor 14. The local controller or computer for the infeed conveyor 14 then operates the various components of the infeed conveyor 14 to load the piece of lumber L into the cutting system 16. The cutting system software then operates the cutting system 16 to cut the piece of lumber L to the shape and length to form the required truss member based on the data received from the communication software. The cutting system software may also operate the printer to print information on each truss member to identify the particular truss member. Once the lumber L is cut, the cutting system software operates the cutting system 16 to transfer (e.g., eject) the cut piece or pieces of lumber out of the cutting system and to the next component in the lumber cutting and delivery system 10. This process repeats until every truss member for the wooden truss has been created by the cutting system 16.

The control system 200 includes a conveyor controller configured to operate the trunk conveyor systems 20 and branch conveyor systems 22 that receive pieces of lumber L cut by the cutting system. Specifically, the conveyor controller is configured to operate the ejectors 66 of the trunk conveyor systems 20 and the motors 56 which drive movement of the conveyor belts 54, 64, 114, 116. Preferably, each trunk and branch conveyor system 22 is connected to the same conveyor controller, although it is possible each conveyor system may have its own controller. The conveyor controller of the control system 200 is configured to operate the corresponding trunk, transition and/or branch conveyors to direct the pieces of lumber L cut by the cutting system 16 to their final destination, which may be set by the production software or by the production manager. If the cut piece of lumber L is a truss member to be used to assemble a wooden truss on a truss table 24, the conveyor controller operates any transition conveyors 18, trunk conveyor systems 20, and branch conveyor systems 22 to deliver the truss member to the desired truss table. More specifically, the conveyor controller operates the conveyor belts and ejectors along the path from the cutting system 16 to the truss table 24 to deliver the cut piece of lumber L (e.g., truss member). This process repeats until all the truss members needed to build the truss design have been delivered to the truss table 24. Similarly, if the cut piece of lumber L is waste or remainder, the conveyor controller is configured to operate the trunk, transition and branch conveyor systems 22 between the cutting system 16 and the receiving unit to deliver the waste and remainder to their final designation, which may be a waste collection system 32 and ramp assembly 28, respectively.

The conveyor controller is in communication with the cutting system 16, specifically, the cutting system software. The conveyor controller may also be in communication with the various sensors of the trunk and branch conveyor systems 22. When the cutting system 16 transfers or ejects a cut piece of lumber L, the cutting system software sends component data for each cut piece of lumber to the conveyor controller. Accordingly, each piece of lumber L ejected by the cutting system 16 has corresponding component data. The component data includes information indicating the where the corresponding cut piece of lumber L is supposed to be transported to (e.g., its final destination). As described in more detail below, the conveyor controller utilizes the component data to operate the trunk, transition and/or branch conveyor systems 20, 18, 22 between the cutting system 16 and the final destination of the cut piece of lumber L to transport the lumber to its final destination.

In addition to sending information to the loading system 12, infeed conveyor 14, and conveyor controller, the cutting system software is also configured (e.g., programmed) to receive data from the loading system, infeed conveyor and conveyor controller. Specifically, the cutting system software is configured to receive performance and history data from the loading system 12, infeed conveyor 14 and conveyor controller, although other information is within the scope of the present invention. The cutting system software can then send this data, along with its own performance and history data, to the production software, via the communication software. Accordingly, it is appreciated that each cutting system 16 acts as a local control station for the line 11 (e.g., assembly line) of which the cutting system is a part. The cutting system 16 receives data from the production software, via the communication software, and controls the operation of the loading system 12, infeed conveyor 14 and any trunk, transition and/or branch conveyor systems 20, 18, 22 associated with the cutting system based off the received data.

The cutting system 16, specifically the cutting system software, may also receive data about what is occurring at the truss table 24 (e.g., that the branch conveyor is full or nearly full, the operator is arranging the truss members on the truss table, etc.) and is configured to take some action in response to the received data. Preferably, the data from the truss table 24, specifically the truss table software, is communicated to the cutting system software via the communication software, but direct communication is also possible. For example, in response to receiving data indicating one receiving unit is at or near capacity, the cutting system software may do different things. In the case where there are no other useful activities for the cutting system 16 to perform, the cutting system software may stop the operation of the cutting system and corresponding components (e.g., loading system 12, infeed conveyor 14, conveyor systems). Alternatively, upon detecting the receiving unit is near capacity, the cutting system 16 may slow down. In addition, where there are other truss tables available in the line (e.g., assembly line), the cutting system may stop working on a job associated with one truss table and start working on the job associated with the other truss table. In one embodiment, the cutting system software may do this automatically.

The machinery database of the cutting system software can store several part (e.g., truss member) instructions from the communication software and the cutting system software can switch to other jobs in the machinery database should a backlog occur. In another embodiment, the cutting system software can send data indicating the stoppage to the communication software and the communication software can schedule other jobs for the cutting system 16 and send corresponding part information. Still further, the cutting system software can convert to production for jobs that are not associated with any truss table. In this case, the cut truss members can be collected and manually or automatically, as described herein, moved to a different location, such as a standalone truss table 24 for assembly into a truss. In addition, when the lumber cutting and delivery system 10 includes multiple cutting systems 16, the cutting system software for each cutting system is in communication with one another, via the communication software. For example, if one cutting system 16 is backlogged with jobs, the cutting system software can send information to the communication software indicating the backlog and the communication software can move or transfer jobs to other cutting systems accordingly.

The control system 200 also controls the operation of any other components of the lumber cutting and delivery system 10, such as the culling stations, robotic cells 30, automated guide carts and/or stackers. Similar to the cutting system 16, any culling stations, robotic cells 30, automated guide carts and/or stackers are in communication with the communication software and are generally controlled by the production software. In other embodiments, one or more of these components may be controlled by the cutting system 16 as described above with the loading system 12, infeed conveyor 14, and trunk, transition and branch conveyor systems 20, 18, 22. When the lumber cutting and delivery system 10 includes culling stations, robotic cells 30, automated guide carts and/or stackers, the production software generates and sends the operational instructions to these components to control their operation.

For example, if the production manager wants the truss members to be stacked, the production manager can input a corresponding command into the production software. The production software will then generate and send operational instructions to the stacker (via the communication software) and the conveyor controller (via the communication software and cutting system software), which directs the conveyor controller to transport the truss members to the stacker and the stacker to stack the received truss members. Likewise, if the production manager wants some of the truss members, waste and/or remainders to be grabbed by the robotic cell and loaded onto an automated guide cart, the production manager can input a corresponding command (or series of commands) into the production software. The production software will then generate and send operating instructions to the robotic cell 30 (via the communication software), the automated guide cart (via the communication software), and the conveyor controller (via the communication software and cutting system software), which directs the conveyor controller to transport the desired truss members, waste and/or remainders to the ramp assembly 28 adjacent the robotic cell, direct the automated guide cart to move into a loading position adjacent to robotic cell 30 and direct the robotic cell to pick up the truss members, waste and/or remainders from the ramp assembly 28 and move them onto automated guide cart. The operating instructions sent to the automated guide cart may also specify the location the automated guide cart is to move to after cart is loaded by the robotic cell 30. Accordingly, it is understood that the control system 200 operates the various components (e.g., cutting system 16, receiving units, loading system 12, etc.) of the lumber cutting and delivery system 10.

The control system 200 may also include a machinery suite that has a one or more displays, one or more user interfaces and a computer connected to the user interface and the display. The computer contains machinery suite software that is configured to show the production manager the current status (e.g., currently operating component, what truss design is being constructed, etc.) of each component of the lumber cutting and delivery system 10. Accordingly, the one or more displays of the machinery suite are spaced around the lumber cutting and delivery system 10. Preferably, the machinery suite software is in communication with the communication software and receives information about the current operation of the different components of the lumber cutting and delivery system 10. The machinery suite software may also receive user input, via the user interface, relating to the operation of the lumber cutting and delivery system 10 and send this input to the communication software. Accordingly, the production manager can control the operation of the lumber cutting and delivery system 10 from the machinery suite. In an alternative embodiment, the machinery suite software can be in communication with the production software. In this embodiment, the production software would not be in direct communication with the communication software such that the machinery suite software receives the job instructions from the production software and then sends the instructions to the communication software. This may be desirable where the production software is not directly compatible with the communication software so that the machinery suite needs to modify or develop compatible instructions from the job instructions before sending the compatible instructions to the communication software. In one embodiment, the machinery suite software may act as a backup to the production software and have the same functionality as the production software.

The control system 200 controls the sorting capability of the lumber cutting and delivery system 10. As described above, the control system 200 can direct the transportation of lumber L from the bunk to a location selected by the production manager or by the control system itself. As a result of the multiple different lumber cutting and delivery system 10 and 10' arrangements, each piece of lumber L cut by the cutting system 16 can be sent to one of several different locations. To make sure each piece of lumber L is transported to the correct location, the control system 200 directs each piece of lumber as it moves along the system. As the piece of lumber L moves along the system, the control system 200 can operate the different trunk conveyor systems 20 to direct the piece of lumber to the receiving unit that is its final destination.

The sorting capability will now be described in more detail. The cutting system 16 cuts a single piece of lumber L received from the storage area as directed by the control system 200. By cutting the piece of lumber L, the cutting system 16 creates lumber classified as a truss member, waste and or remainder, as described above. The truss member, waste or remainder is then transported out of the cutting system 16 to a trunk conveyor system 20. Because the cutting system software directed the cutting system 16, the cutting system software knows in which order the truss member, waste and/or remainder leaves the cutting system (e.g., the cutting system software directed the cutting system to cut the truss member from the leading end of the piece of lumber L and therefore the truss member is the first piece to leave the cutting system). As mentioned above, for each cut piece of lumber L ejected by the cutting system 16, the cutting system software sends corresponding component data which includes information (e.g., destination data) about where that respective cut piece is to be delivered to. The destination data for a truss member is set by the production software which sent data indicating which truss table 24 (or other component) the truss member is to be delivered to as part of the job instructions. The destination data for the waste and remainders is set by the cutting system software. The production manager can input into the cutting system software, via the user interface of the human machine interface 17, the destination location (e.g., receiving unit) for waste and remainders. Alternatively, the destination data for the waste and remainders may be set by the production software, either automatically (e.g., a default location) or by the production manager. Accordingly, the cutting system software categorizes each cut piece of lumber L as a truss member, waste or remainder and then includes the corresponding destination data in the component data The conveyor controller of the control system 200 stores each component data in a queue (e.g., memory) in the order the component data is received. Thus, the first component data sent by the cutting system software is the first in the queue, the second component data sent by the cutting system software is second in the queue and so on. Accordingly, the order of each component data in the queue matches the order the corresponding pieces of lumber L exited the cutting system 16. When the sensing system 104 on the trunk conveyor system 20 closest to the cutting system 16 (e.g., the first trunk conveyor system) detects a piece of lumber L on the first conveyor belt, the sensors 106 relay this information to the conveyor controller (broadly, the control system 200). The conveyor controller then identifies the piece of lumber L by matching the information from the sensors 106 to the component data first in the queue. Thus, the control system 200 identifies the pieces of lumber L based on the order each piece of lumber leaves the cutting system 16. It is also envisioned that the sensing system 104 may read the identifying information on the truss members to track their location, such as identifying information marked on the pieces by the printer.

Once the conveyor controller has matched the piece of lumber L with its corresponding component data in the queue, the conveyor controller reads the destination data and sends a corresponding signal to the trunk conveyor system 20. This signal can direct the trunk conveyor system 20 to operate the ejector 66 to move the piece of lumber L onto a receiving unit on either side of the trunk conveyor system or to stay the ejector and continue operating the first conveyor belt 64 until the piece of lumber is transferred to a receiving unit located at the end of the first conveyor belt, in response to the read destination data for the piece of lumber on the trunk conveyor system. The control system 200 or a part thereof (e.g., conveyor controller) then sends a signal to operate the next receiving unit in the system, such as another trunk conveyor system 20 or other receiving unit, until the piece of lumber L is transported to its final location. When the next, subsequent cut piece of lumber L is sensed by the first trunk conveyor system 20, the conveyor controller identifies the piece of lumber by matching it to the next, subsequent component data in the queue and repeats the process. Accordingly, as each cut piece of lumber L is sensed by the first trunk conveyor system 20, the piece of lumber is identified by the control system 200 which then operates the necessary components to direct the piece of lumber to its final destination. This process is repeated until all the truss members for the selected truss have been cut and transported to their selected location. Similarly, this process can also be repeated until all the waste and remainders have been transported to their selected locations as well.

In one example, the control system 200 can control the trunk conveyor system 20 to sort cut truss members and/or remainders into groups of different lengths. In this instance one or more receiving units in the form of bins (not shown) can be placed along the trunk conveyor. Each bin would have a certain length board associated with it in the production and/or cutting system software. As a board of a particular length travels down the trunk conveyor, it can be pushed off the trunk conveyor system 20 by the ejector 66 into the bin having boards of the selected length.

Thus, it is apparent that as long as the production manager or program (e.g., production and/or cutting system software) selects a different location for each piece of lumber L classified as truss members, waste, and remainders by the cutting system software, the control system 200 can sort or direct these pieces of lumber to their different locations. Further, if two or more truss tables 24 are included in the system (e.g., lumber cutting and delivery system 10'), the control system 200 can identify each truss member, as described above, and transport them to the correct truss table while transporting the waste and remainders to their selected locations as well. Thus, even though the lumber cutting and delivery system 10 of the present invention can include multiple truss tables 24, the system only needs a single collection location for each of the waste and the remainders, if the production manager wishes to utilize the sorting capabilities of the system.

For example, suppose a lumber cutting and delivery system 10 is arranged to include a branch conveyor system 22 on the first side of the trunk conveyor system 20 leading to a truss table 24, a ramp assembly 28 on the second side of the trunk conveyor system and a waste collection system 32 at the end of the trunk conveyor system. Because the lumber cutting and delivery system 10 only includes one truss table 24, the production software automatically sets the truss table, or more specifically the branch conveyor system 22 leading to the truss table, as the final destination for the truss members, unless the operator instructs the production software to the contrary. In addition, the production manager instructs the cutting system software to set the waste collection system 32 as the final destination for any waste and the ramp assembly 28 as the final destination for any remainders. In one embodiment, the cutting system software may automatically determine whether a cut piece of lumber L is waste or remainder. In another embodiment, the production manager may input a set length into the cutting system software which is used by the cutting system software to classify the cut piece of lumber L (e.g., all non-truss members ejected by the saw equal to or over the set length are remainders, all non-truss members ejected by the saw under the set length are waste). Other ways of classifying remainders are within the scope of the present invention. For example, in one embodiment, the cutting system software classifies remainders based on if the cut piece of lumber L can be used to cut a subsequent truss member for use in constructing the truss.

In this example, suppose the control system 200 (e.g., communication software and/or cutting system software) has decided a six-foot truss member is the next member required to construct a truss on a truss table 24 adjacent to the branch conveyor system 22. The control system 200 (e.g., cutting system software) sends a signal to the loading system 12 instructing the loading system to deliver an eight-foot piece of lumber L to the infeed conveyor 14. Once the eight-foot piece of lumber L is placed on the infeed conveyor 14 the control system 200 (e.g., cutting system software) instructs the infeed conveyor to move the eight-foot piece of lumber into the cutting system 16. The cutting system 16, at the instruction of the control system 200 (e.g., cutting system software), then cuts the six-foot truss member from the leading end of the eight foot piece of lumber L. This results in the six-foot truss member exiting the cutting system 16 first followed by the leftover two-foot piece of lumber L. For this example, this leftover two-foot piece of lumber L will be classified as waste. Because the six-foot truss member was cut from the leading edge of the lumber L at the direction of the control system 200 (e.g., cutting system software), the six-foot truss member reaches the sensing system 104 on the trunk conveyor system 20 first. The sensors 106 then send a signal to the control system 200 (e.g., conveyor controller) indicating a piece of lumber L has been received on the first conveyor belt 64. The control system 200 (e.g., conveyor controller) then matches this signal to the first component data in the queue and identifies this board as the six-foot truss member. The control system 200 (e.g., conveyor controller) then reads the destination data corresponding to the matched component data and sends the instructions, based on the destination data, to the trunk conveyor system 20 to operate the first conveyor belt 64 and ejector 66 to push the six-foot truss member onto the branch conveyor system 22. The control system 200 (e.g., conveyor controller) then continues to operate the branch conveyor system 22 to transport the six-foot member to the truss table 24. Once the six-foot truss member is delivered, the second conveyor sensor 120 can send a signal to the control system 200 (e.g., conveyor controller) indicating the main conveyor belt 114 and secondary conveying element 116 can stop moving, as described above.

As the lumber cutting and delivery system 10 continues to operate, the waste will be the next cut piece of lumber L ejected by the cutting system 16 to reach the sensing system 104 on the trunk conveyor system 20. Similarly, the control system 200 (e.g., conveyor controller) matches this second signal from the sensors 106 to the next, subsequent component data in the queue which is the component data for the second piece of lumber L that exited the cutting system 16, in this case the waste. The control system 200 (e.g., conveyor controller) then reads the destination data which instructs the control system to direct the waste to the waste collection system 32. The control system 200 (e.g., conveyor controller) then sends the corresponding instructs to the trunk conveyor system 20 to operate the first conveyor belt 64, without operating the ejector 66, to transport the waste to the waste collection system 32.

In this example, suppose the control system 200 next decides a four-foot truss member is the next member to construct the truss. The control system 200 will then send out signals to the loading system 12, infeed conveyor 14 and cutting system 16 to form the four-foot truss member. In this case, suppose the control system 200 directs the cutting system 16 to cut the four-foot truss member from the trailing edge of the eight foot piece of lumber L. This results in a leftover four-foot piece of lumber L exiting the cutting system 16 before the four-foot truss member. For this example, this leftover four-foot piece of lumber L will be classified as remainder. Because the remainder exited the cutting system 16 before the four-foot truss member, the remainder reaches the sensing system 104 on the trunk conveyor system 20 before the four-foot truss member. The sensors 106 then send a signal to the control system 200 indicating another piece of lumber L has been received on the first conveyor belt 64. The control system 200 then matches this third signal to the third piece of lumber L that exited the cutting system 16 and identifies this board as remainder. The control system 200 then continues to operate the first conveyor belt 64 and ejector 66 to push the remainder onto the ramp assembly 28. As the lumber cutting and delivery system 10 continues to operate, the four-foot truss member will reach the sensing system 104 on the trunk conveyor system 20. Similarly, the control system 200 will match this fourth piece of lumber L detected by the sensors 106 to the fourth piece of lumber that exited the cutting system 16. The control system 200 then sends a signal to operate the first conveyor belt 64 and ejector 66 to push the four-foot truss member onto the branch conveyor system 22. The control system 200 then continues to operate the branch conveyor system 22 until the four-foot truss member is transported to the truss table 24. This process is repeated until all the truss members required to form the selected truss have been cut and delivered to the truss table 24.

The sensing system 104 on the trunk conveyor system 20 can be further utilized to inform the control system 200 (e.g., conveyor controller) when the piece of lumber L is in position on the first conveyor belt 64 to be moved by the ejector 66. Because the sensors 106 can detect the leading and trailing edge of the board, the sensors can send a signal to the control system 200 (e.g., conveyor controller) indicating when the entire length of a piece of lumber L is on the first conveyor belt 64. The control system 200 (e.g., conveyor controller) can then direct the ejector 66 to push the piece of lumber L. Based on the distance between the sensors 106 and the receiving unit in combination with the speed of the first conveyor belt 64, the timing between when the trailing edge of the lumber L passes the sensors and when the ejector 66 needs to be operated to make sure the piece of lumber is properly moved onto the receiving unit can be accounted for by the control system 200 (e.g., conveyor controller).

The control system 200 for the lumber cutting and delivery system 10 can also include one or more remote stations 26 (FIG. 29) linked to one or more of the components of the control system. For example, the remote station 26 can be linked to and in communication with the communication and/or cutting system software. The remote stations 26 are configured to display information about the operation of the lumber cutting and delivery system 10. The remote stations 26 can be placed at different locations along the lumber cutting and delivery system 10. In the preferred embodiment, each truss table 24 has a remote station 26 located adjacent to it. This way a production manager can monitor the lumber cutting and delivery system 10 while arranging the truss members on the truss table 24. Each remote station 26 can communicate with the components of the control system 200 through a communication link. The communication link can be wired or wireless through a wireless fidelity (Wi-Fi) system or other short-range wireless communication system. These types of communication links can also be used by the other components of the lumber cutting and delivery system 10 to allow the various components of the control system 200 to communicate with (e.g., send and receive signals) each other.

Each remote station 26 includes a display 204 and a user interface 202. The display 204 shows information related to the operation of the lumber cutting and delivery system 10. The user interface 202 can receive inputs by the production manager. The remote station 26 can then send those inputs to the other components of the control system 200 (e.g., production software, communication software, cutting system software) to control the operation of the lumber cutting and delivery system 10. The remote stations 26 allow a production manager to monitor and/or control the lumber cutting and delivery system 10, specifically the cutting system 16, without having to be at the central control station 201.

As described above, the cutting system software is configured to operate at least some of the components (e.g., loading system 12, infeed conveyor 14, trunk conveyor system 20, branch conveyor system 22, transition conveyor system 18, etc.) of each line 11 (e.g., assembly line) the cutting system 16 is a part of. In addition to the description above, the cutting system software includes a configuration system and an execution system. The execution system is configured to execute a set of processes on at least some, if not all, of the components or pieces of equipment, that are part of the cutting system's line 11, to carry out the component's respective task(s), as described above. In order to execute the set of processes, the execution system either communicates with the local controller or computer for each component or can operate as the control for the component if a local control is not present.

In one embodiment, the cutting system software sends data (e.g., parameters, instructions, commands, etc.) to the local controller or computer of the component and then the local controller or computer executes one or more sets of instructions, based off the received data, on the component. An instruction can be executed by utilizing a capability of a component. For example, an instruction can be sent to the branch conveyor system 22 by the conveyor controller to turn on the motor 56 driving the main conveyor belt 114 in response to cutting system software sending data (e.g., destination data) to the conveyor controller indicating a corresponding truss member is to be transported by the branch conveyor system 22. Likewise, another instruction can be sent to the branch conveyor system 22 by the conveyor controller to turn off the motor 56 in response to a signal sent by sensor 120 on the branch conveyor system. In this manner, the cutting system software can control the physical aspects of each component by sending data to that component and having a corresponding instruction executed on that component. In one embodiment, the data sent to the component by the cutting system software may be the instruction to be executed by the component. As discussed below, each component of the lumber cutting and delivery system 10 can be represented in the cutting system software.

The configuration system includes a database stored on a computer readable medium in the computer of the human machine interface 17 of the cutting system 16. The database stores a collection of pre-programmed modules. The modules are pre-programmed in the sense that the production manager does not input the modules. Each pre-programmed module represents a type of component (e.g., receiving unit) that can be used in the lumber cutting and delivery system 10. Each pre-programmed module contains information (e.g., parameters, instructions, commands, etc.) that relates to the operation of the component. The configuration system also includes an arrangement model which receives production manager inputs. As explained in more detail below, the arrangement model communicates with the database and the execution system.

The execution system includes an execution driver, which includes logic and a code base for sending data to a component so that an instruction can be executed by the component, and the machinery database. The execution driver communicates with the components in order to execute the instructions thereupon. The execution system can also receive data from the components, such as performance and history data or data from sensors. The execution driver is configured to be run by the cutting system software on the computer of the cutting system 16. As explained in more detail below, the machinery database communicates with the execution driver.

Before operation of the lumber cutting and delivery system 10, the configuration system of the cutting system software must be set up. The user interface 202 is used to open up a configuration screen, shown on the display 204. The configuration screen shows a series of icons in an icon menu. Each icon corresponds to a different system component used in the lumber cutting and delivery system 10 and is linked to that component's respective pre-programmed module. The configuration screen also shows the arrangement model, shown on the display screen as a two dimensional layout. The icons that correspond to the components in the lumber cutting and delivery system 10 are then selected from the icon menu and the icons are arranged onto the two dimensional layout displayed. The icons are arranged on the two dimensional layout to correspond to the physical arrangement of components that are part of the cutting system's line 11 (e.g., assembly line). Once the icons are all arranged, the arrangement model is then stored on the computer readable medium. In this manner, the arrangement model stores the relationships between the icons, and thus the pre-programmed modules, that reflect the actual relationships between the components in the lumber cutting and delivery system 10. This arrangement model can be changed or updated as the lumber cutting and delivery system 10 changes over time.

The machinery database receives and stores data from the communication software about the truss. The machinery database receives and stores such truss information such as the length of each truss member, the angle and amount of miter cuts required to form each truss member, and the number of truss members required to construct the desired truss. The machinery database also receives and stores data from the production manager and/or production software about where to transport the cut piece of lumber L.

Upon receiving a signal, which may be sent by the production manager via the user interface 202 or by the remote station 26 or the production software, the execution driver operates the components (e.g., loading system 12, infeed conveyor 14, conveyor systems, etc.) connected to the cutting system 16. The execution driver communicates with the machinery database and reads the data corresponding to the truss to be built. The execution driver then selects the first truss to be built and accesses the arrangement model stored on the computer readable medium. The execution driver then reads the arrangement model to compile an order of icons corresponding to the components between the first component and final (e.g., destination) component to which the lumber L is transported. The execution driver reads the icons and then accesses the pre-programmed module corresponding to each icon in the arrangement model. The execution driver then selects the necessary information from the pre-programmed module and sends the information to the corresponding local control for the component. The execution driver includes any data necessary for the operation of the component from the machinery database in the information sent to the local control. For example, when sending information to the local control for the loading system 12, the execution driver may include data from the machinery database that identifies the size of the piece of lumber L the loading system 12 is to select. The preprogrammed modules may include directives which, when read by the execution driver, tell the execution driver what data from the machinery database needs to be included in the information sent to the local control. Once the local control for the component receives the information from the execution system, the local control then executes instructions on the component based on the received information. This process is done with each component in order to operate each component and transport the piece of lumber L to its final destination. The execution driver reads the arrangement model to know which components are along the path the lumber L is transported on to reach its final destination and sends information to each component along that path so that the components can execute instructions to transport the lumber L along the path. This process is repeated until the execution driver has sent the necessary information to each component along the path to transport every piece of lumber L associated with the truss, the truss member, waste and/or remainder, to their final destinations.

The execution driver can also receive signals from the components. The signals contain data which the execution driver then reads. After the execution system reads the data, the execution driver can then decide what response to take based on the received data. For example, the execution driver can send additional information (e.g., parameters, instructions, commands, etc.) in response and/or store the data (e.g., performance and/or history data) for access at a later time, such as to send to the production software. The execution driver can receive data from any component, such as but not limited to, the cutting system 16, the trunk conveyor system 20, the branch conveyor system 22, the robotic cell 30, and the loading system 12.

Accordingly, the cutting system software can be integrated with separate, individual local component (e.g., loading system) control systems. This way the production manager only has to interact with only one program (e.g., the production software which in turn communicates with the cutting system software) to control the lumber cutting and delivery system 10 instead of interacting with each individual local component control system, simplifying the process. In addition, by localizing the control of each line by using the cutting system software, additional lines 11 can be easily added to the lumber cutting and delivery system 10 by connecting each additional line's cutting system software to the communication software.

The lumber cutting and delivery system 10 of the present invention solves many of the above discussed problems as well as adding new capabilities. By way of summarizing the foregoing, the lumber cutting and delivery system 10 of the present invention is comprised of modular components arranged to select, cut and deliver lumber L to a truss table 24 to build a truss. The lumber cutting and delivery system 10 generally includes a loading system 12, an infeed conveyor 14, a cutting system 16, a control system 200, a trunk conveyor system 20, a branch conveyor system 22, and a truss table 24.

The loading system 12 of the present invention transports the lumber L from the storage area to the infeed conveyor 14. The loading system 12 transports the lumber L in a direction transverse to its longitudinal axis from a bunk in the storage area to feed the lumber to the lumber cutting and delivery system 10.

The infeed conveyor 14 receives the lumber L from the loading system 12 and feeds the lumber into the cutting system 16 for cutting in a direction that is parallel to the lumber's longitudinal axis. The cutting system 16 cuts the lumber L to form the truss member. The cutting system 16 then transports the lumber L in a direction parallel to the lumber's longitudinal axis to the trunk conveyor system 20. The trunk conveyor system 20 can then transport the lumber L to one of three locations: the end of the trunk conveyor system or to either side of the trunk conveyor system. A receiving unit is placed at each of these three locations to receive the lumber L from the first cutting system 16. In this case, a branch conveyor system 22 is located to one side of trunk conveyor system 20. The ejector 66 of the trunk conveyor system 20 is operated to push the lumber L in a direction that is transverse to the longitudinal axis of the lumber's longitudinal axis onto the branch conveyor system 22. The branch conveyor system 22 then continues to transport the lumber L in this transverse direction to the truss table 24.

The control system 200 is connected to each system component in the lumber cutting and delivery system 10. The control system 200 receives input regarding the truss to be constructed and the destination point for each piece of lumber L. The control system 200 then sends out signals to each of the respective system components to select, cut and transport the lumber L to the desired locations.

Other receiving units, such as additional trunk conveyor systems 20, transition conveyors 18, additional branch conveyor systems 22, stackers, waste collection systems 32, and ramp assemblies 28 with robotic cells 30 can also be arranged in the lumber cutting and delivery system 10 of the present invention to meet the needed truss production.

In view of the above, it will be seen that the several features of the invention are achieved and other advantageous results obtained.

The lumber cutting and delivery system 10 is able to transport the lumber L from the cutting system 16 to the truss table 24, eliminating the need for an operator to perform this task. This saves time on labor. The lumber cutting and delivery system 10 is able to direct the lumber L to different receiving units. This allows the system to sort through the lumber L and only transport the desired pieces of lumber to selected components. For example, the system can transport all the truss members to a branch conveyor system 22, all the waste members to a waste collection system 32, and all the remainders to a ramp assembly 28. The sorting capability of the system eliminates the need for the operator to perform this task, as was required in the prior art systems. In another aspect of the present invention, the lumber cutting and delivery system 10 is able to transport truss members cut by a single cutting system 16 to multiple different truss tables 24. The control system 200 is able to communicate with and control every component in the system, providing the production manager with a single interface from which to control the lumber cutting and delivery system 10. Further, the control system 200 is configurable in many different physical arrangements of the different components in the lumber cutting and delivery system 10.

In view of the above, it will be seen that the lumber cutting and delivery system 10 is extremely flexible and customizable, able to take on numerous different arrangements to fit the truss building needs of a particular production facility.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A lumber cutting and delivery system for use in assembling trusses on a truss table, the lumber cutting and delivery system comprising:
   a saw configured to receive a piece of material therein, the saw being configured to cut the piece of material into one or more pieces, the saw being configured to cut the piece of material at different lengths and angles so that at least some of the one or more pieces are the components of at least one of the trusses;
   a trunk conveyor system positioned to receive the one or more pieces cut from the saw, the trunk conveyor system having a first conveying element to transport the one or more pieces over a first distance in a first travel direction and an ejector arranged to discharge the one or more pieces from the first conveying element in a first discharge direction;
   a branch conveyor system arranged to receive the one or more pieces discharged from the trunk conveyor system in the first discharge direction, the branch conveyor system having a movable main conveying element configured to support the one or more pieces on top of the movable main conveying element to transport the one or more pieces over a second distance in a second travel direction transverse to the first travel direction; and a control system, wherein the branch conveyor system includes at least one sensor arranged to detect the one or more pieces, the at least one sensor in communication with the control system and configured to send a signal to the control system in response to said detecting.

2. The lumber cutting and delivery system of claim 1, further wherein the control system is in communication with the saw and configured to associate each piece of the one or more pieces with a category from a plurality of categories based on information received from the saw.

3. The lumber cutting and delivery system of claim 2, wherein the control system is in communication with the trunk conveyor system and is further configured to direct the ejector to discharge a respective piece of the one or more pieces from the first conveying element in the first discharge direction and onto the branch conveyor system when said respective piece is of a first category of the plurality of categories.

4. The lumber cutting and delivery system of claim 3, wherein the ejector is further arranged to discharge the one or more pieces from the first conveying element in a second discharge direction and further comprising a first receiving unit arranged to receive the one or more pieces discharged from the trunk conveyor system in the second discharge direction, wherein the control system is further configured to direct the ejector to discharge a respective piece of the one or more pieces from the first conveying element in the second discharge direction and onto the first receiving unit when said respective piece is of a second category of the plurality of categories.

5. The lumber cutting and delivery system of claim 4, wherein the first category of the plurality of categories signifies a respective piece of the one or more pieces is a component of the at least one truss to be assembled on the truss table and wherein the second category of the plurality of categories signifies a respective piece of the one or more pieces is either a waste component or a remainder component.

6. The lumber cutting and delivery system of claim 4, wherein the trunk conveyor system is further configured to discharge the one or more pieces from the first conveying element in a third discharge direction and further comprising a second receiving unit arranged to receive the one or more pieces discharged from the trunk conveyor system in the third discharge direction, wherein the control system is further configured to direct the trunk conveyor system to discharge a respective piece of the one or more pieces from the first conveying element in the third discharge direction and onto the second receiving unit when said respective piece is of a category that is not the first or second categories.

7. The lumber cutting and delivery system of claim 1, wherein the ejector comprises a swing arm movably positioned above the first conveying element, the swing arm arranged to push the one or more pieces out of the trunk conveyor system.

8. The lumber cutting and delivery system of claim 7, wherein the swing arm is arranged to push the one or more pieces out of the trunk conveyor system in the first discharge direction.

9. The lumber cutting and delivery system of claim 8, wherein the swing arm is arranged to push the one or more pieces out of the trunk conveyor system in a second discharge direction.

10. The lumber cutting and delivery system of claim 1, wherein the signal stops the movement of the main conveying element.

11. The lumber cutting and delivery system of claim 1, in combination with the truss table, the truss table being disposed adjacent to the branch conveyor system and having a work surface on which at least some of the one or more pieces are supported to assemble the at least one truss.

12. A lumber cutting and delivery system for use in assembling wooden constructs on a table, the lumber component cutting and delivery system comprising:
   a saw configured to receive a piece of material therein and cut the piece of material into a component member to be used in the creation of the wooden construct, a waste member to be discarded, and/or a remainder member capable of being cut by the saw again into an additional component member;
   a trunk conveyor system positioned to receive the component member, waste member, and/or remainder member cut by the saw, the trunk conveyor system having a first conveying element to transport the component member, waste member, and/or remainder member over a distance and an ejector arranged to selectively discharge the component member, waste member, and/or remainder member off of the first conveying element; and
   a first receiving unit adjacent to the first conveying element and arranged to receive the component member, waste member, and/or remainder member from the trunk conveyor system when the component member, waste member, and/or remainder member is discharged off of the first conveying element by the ejector;
   wherein the trunk conveyor system includes a sensor positioned at the front of the first conveying element, the sensor being arranged to detect when the component member, waste member, and/or remainder member is completely on the first conveying element and send a signal indicating the component member, waste member, and/or remainder member can be discharged by the ejector from the first conveying element.

13. The lumber cutting and delivery system of claim 12, further comprising a control system in communication with the saw and configured to identify the component member, waste member, and remainder member cut from the piece of material based on information received from the saw.

14. The lumber cutting and delivery system of claim 13, wherein the control system is further configured to track the order the component member, waste member, and/or remainder member exit the saw in order to identify the component member, waste member and/or remainder member.

15. The lumber cutting and delivery system of claim 14, wherein the control system is in communication with the trunk conveyor system and further configured to track the order the component member, waste member, and/or remainder member enter the trunk conveyor system in order to identify the component member, waste member, and/or remainder member when said component member, waste member, and remainder member are being transported by the trunk conveyor system.

16. The lumber cutting and delivery system of claim 15, wherein the control system is further configured to direct the ejector to discharge one of the component member, waste member, or remainder member onto the first receiving unit.

17. The lumber cutting and delivery system of claim 16, further comprising a second receiving unit adjacent to the first conveying element and arranged to receive the component member, waste member and/or remainder member discharged from the first conveying element by the ejector, wherein the control system is further configured to direct the ejector to discharge one of the component member, waste member or remainder member onto the second receiving unit.

18. The lumber cutting and delivery system of claim 17, wherein the control system is further configured to direct the ejector to discharge the component member onto the first receiving unit and direct the ejector to discharge the waste member and/or remainder member onto the second receiving unit.

19. The lumber cutting and delivery system of claim 17, wherein the ejector of the trunk conveyor system comprises a swing arm movably positioned above the first conveying element, the swing arm arranged to selectively push the component member, waste member, and/or remainder member out of the trunk conveyor system onto the first receiving unit or the second receiving unit.

20. The lumber cutting and delivery system of claim 12, further comprising a control system configured to receive the signal from the sensor and direct the ejector to discharge the component member, waste member, and/or remainder member from the first conveying element after receiving the signal from the sensor.

21. The lumber cutting and delivery system of claim 20, further comprising a second receiving unit positioned at an end of the first conveying element and arranged to receive the component member, waste member and/or remainder member from the end of the first conveying element, wherein the control system is further configured to direct the trunk conveyor system to transfer the component member, waste member and/or remainder member to the second receiving unit.

22. The lumber cutting and delivery system of claim 12 in combination with the table, the table having a work surface on which the component members are supported to assemble the wooden construct.

\* \* \* \* \*